US012608927B2

(12) United States Patent
Wada et al.

(10) Patent No.: US 12,608,927 B2
(45) Date of Patent: Apr. 21, 2026

(54) IMAGE PROCESSING APPARATUS AND MATERIAL INFORMATION OBTAINMENT METHOD

(71) Applicant: Sony Interactive Entertainment Inc., Tokyo (JP)

(72) Inventors: Shinya Wada, Tokyo (JP); Hiroyuki Segawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 189 days.

(21) Appl. No.: 18/565,516

(22) PCT Filed: Jun. 10, 2021

(86) PCT No.: PCT/JP2021/022129
§ 371 (c)(1),
(2) Date: Nov. 30, 2023

(87) PCT Pub. No.: WO2022/259466
PCT Pub. Date: Dec. 15, 2022

(65) Prior Publication Data
US 2024/0257514 A1      Aug. 1, 2024

(51) Int. Cl.
*G06V 10/70* (2022.01)
*G06V 10/14* (2022.01)
(Continued)

(52) U.S. Cl.
CPC .............. *G06V 10/87* (2022.01); *G06V 10/14* (2022.01); *G06V 10/60* (2022.01); *G06V 10/945* (2022.01)

(58) Field of Classification Search
CPC ...................................................... G06V 10/87
See application file for complete search history.

(56) References Cited

U.S. PATENT DOCUMENTS

2015/0077569 A1      3/2015  Ho et al.
2020/0401839 A1*  12/2020  Ogasawara ............ G01N 21/55
(Continued)

FOREIGN PATENT DOCUMENTS

JP        H09-081889  A      3/1997
JP        2002-360521  A    12/2002
(Continued)

OTHER PUBLICATIONS

International Search Report and Written Opinion mailed on Aug. 24, 2021, received for PCT Application PCT/JP2021/022129, filed on Jun. 10, 2021, 10 pages including English Translation.
(Continued)

*Primary Examiner* — Cynthia Calderon
(74) *Attorney, Agent, or Firm* — Fish & Richardson P.C.

(57)      ABSTRACT

A captured image obtainment unit in an image processing apparatus obtains multiple sets of polarized images that have been captured while causing image capturing states to differ. For each polarized image, a polarization degree obtainment unit obtains a degree of polarization for an image of a target object. An image selection unit in a material information estimation unit, on the basis of the degree of polarization or additional information, selects an input image and a type thereof. An algorithm switching unit, on the basis of the degree of polarization or additional information, switches an algorithm used in material information estimation. An estimation unit uses the input image to estimate material information using the algorithm that was switched to. An output data generation unit generates an image using the material information and outputs the image to a display apparatus.

15 Claims, 16 Drawing Sheets

| ALGORITHM | HIGH DEGREE OF POLARIZATION | | | | LOW DEGREE OF POLARIZATION | | |
| --- | --- | --- | --- | --- | --- | --- | --- |
| | MATERIAL | | | | MATERIAL | | |
| | UNCLEAR | PLASTIC | VINYL | ··· | UNCLEAR | PLASTIC | ··· |
| DEEP LEARNING (MODEL A) | k1 | k4 | k7 | ··· | k10 | k13 | ··· |
| DEEP LEARNING (MODEL B) | k2 | k5 | k8 | ··· | k11 | k14 | ··· |
| ARITHMETIC PROGRAM a | k3 | k6 | k9 | ··· | k12 | k15 | ··· |
| ··· | ··· | ··· | ··· | ··· | ··· | ··· | ··· |

240

(51) Int. Cl.
    *G06V 10/60*        (2022.01)
    *G06V 10/94*        (2022.01)

(56)         References Cited

U.S. PATENT DOCUMENTS

| | | | |
|---|---|---|---|
| 2021/0178265 A1* | 6/2021 | Wada | G06T 7/514 |
| 2022/0230273 A1* | 7/2022 | Lu | G06T 7/90 |
| 2023/0410457 A1* | 12/2023 | Kondo | G06V 10/751 |
| 2024/0240986 A1* | 7/2024 | Kupinski | G01N 21/211 |

FOREIGN PATENT DOCUMENTS

| | | |
|---|---|---|
| JP | 2012-080065 A | 4/2012 |
| JP | 2016-109443 A | 6/2016 |
| JP | 2019-020330 A | 2/2019 |
| WO | WO 2007029446 A1 | 3/2007 |
| WO | 2017/145249 A1 | 8/2017 |
| WO | 2018/092540 A1 | 5/2018 |
| WO | WO-2019003383 A1 * | 1/2019  ............... G06T 7/90 |
| WO | 2020054076 A1 | 3/2020 |

OTHER PUBLICATIONS

Meka et al., "LIME: Live Intrinsic Material Estimation," 2018 IEEE/CVF Conference on Computer Vision and Pattern Recognition (CVPR), 2018, vol. 1, pp. 6315-6324.

Simonyan et al., "Very Deep Convolutional Networks for Large-Scale Image Recognition," CoRR, Submitted on Apr. 10, 2015, arXiv:1409.1556v6, 14 pages.

* cited by examiner

START

S10   OBTAIN CAPTURED IMAGE

S12   CUT OUT TARGET REGION

S14   MASK PROCESSING

S16   ESTIMATE MATERIAL INFORMATION

S18   USE MATERIAL INFORMATION

END

F I G . 5
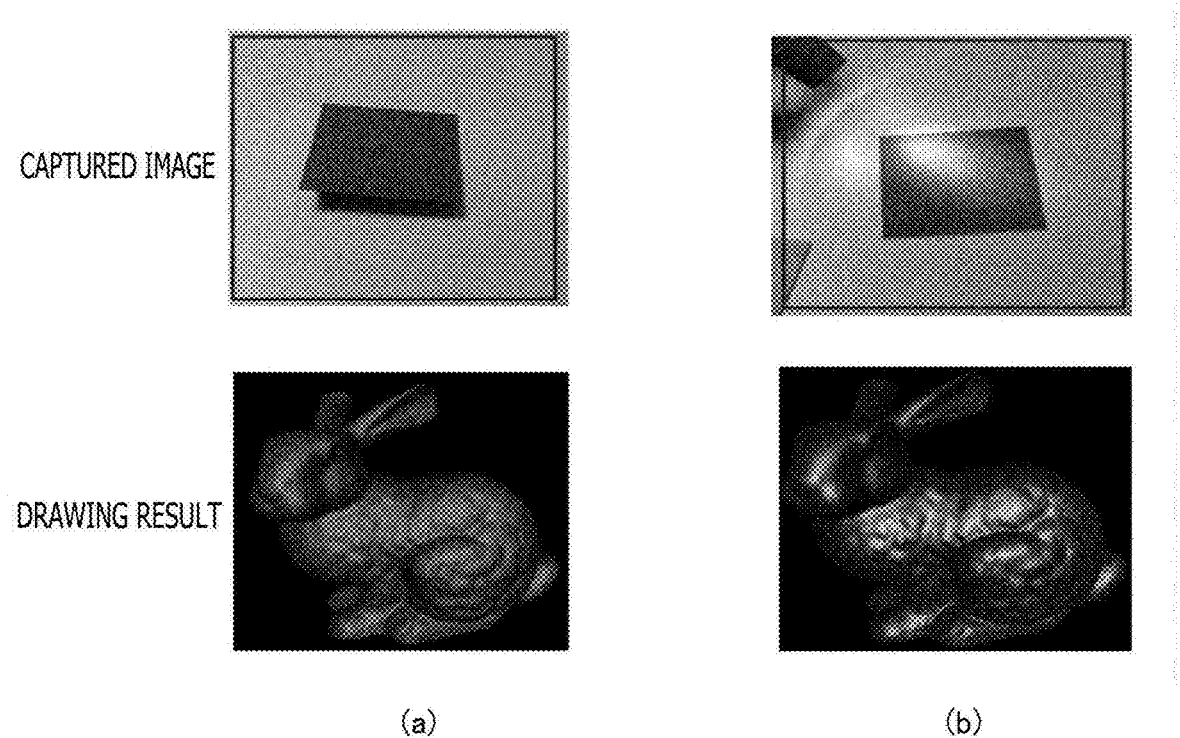
(a)                              (b)
F I G . 6
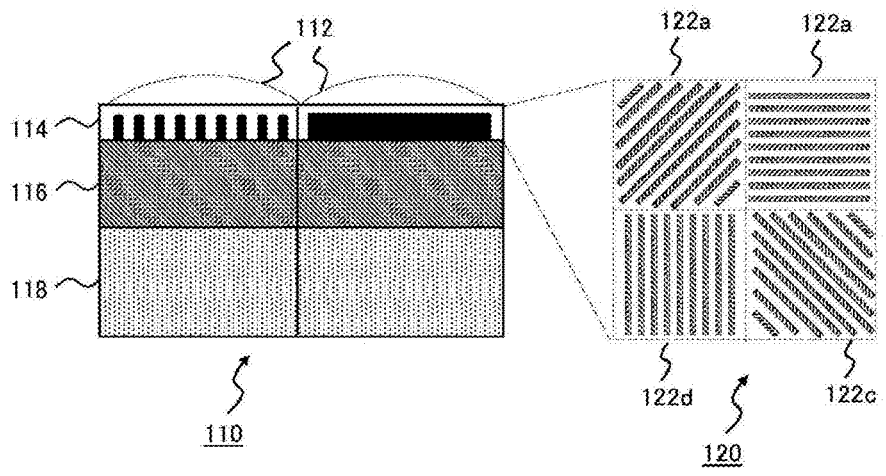

F I G . 9
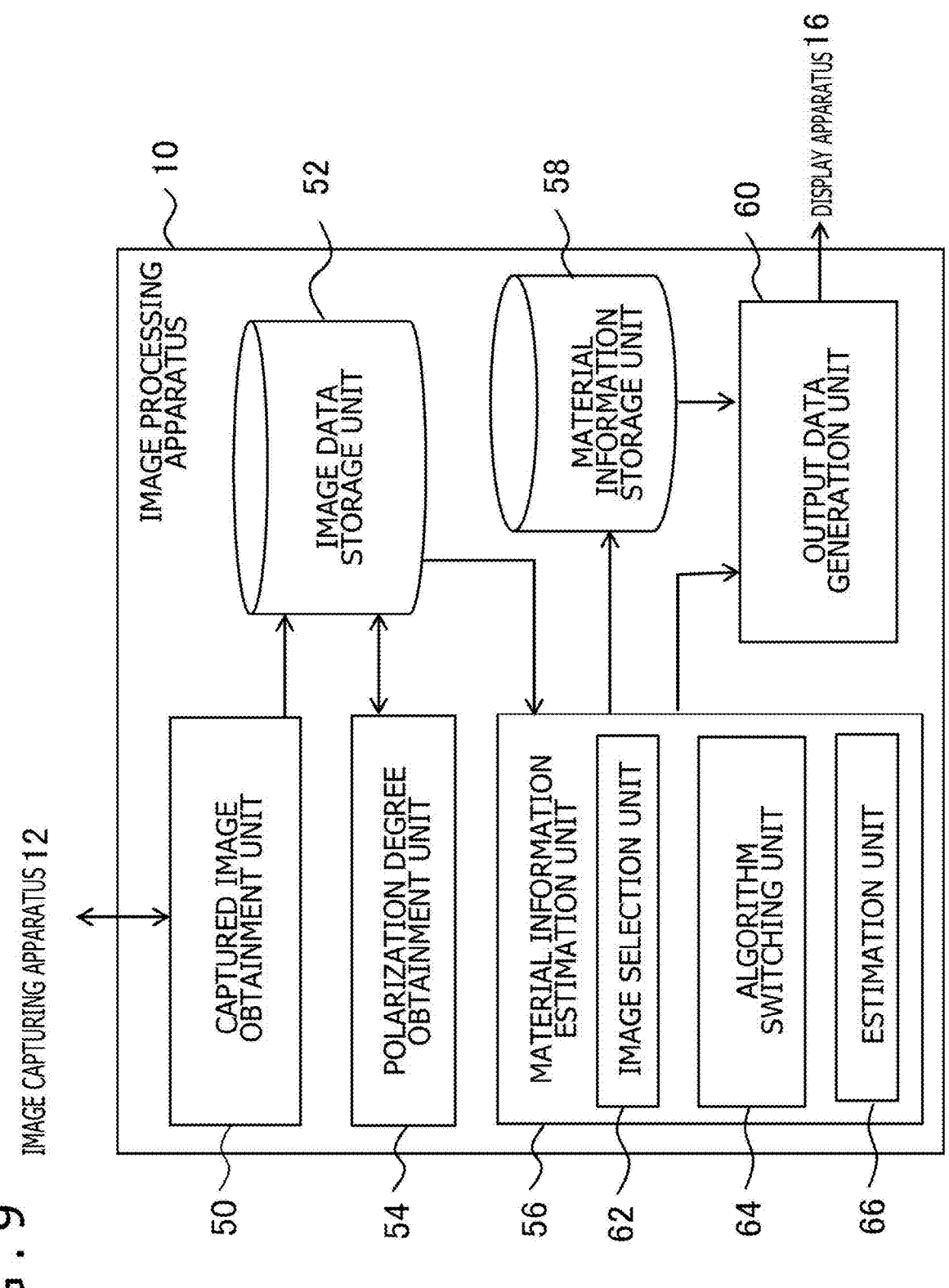

PLEASE CHANGE ANGLE OF TARGET OBJECT

| IMAGE | DEGREE OF POLARIZATION |
|-------|------------------------|
| #1    | 0.10                   |
| #2    | 0.25                   |
| #3    | 0.40                   |
| #4    | 0.31                   |

| DEGREE OF POLARIZATION | MATERIAL | INPUT DATA | ALGORITHM |
|---|---|---|---|
| HIGH | UNCLEAR | SPECULAR REFLECTION IMAGE | DEEP LEARNING (MODEL A) |
| | PLASTIC | | DEEP LEARNING (MODEL B) |
| | VINYL | NATURAL LIGHT COLOR IMAGE | ARITHMETIC PROGRAM a |
| | ... | ... | ... |
| LOW | UNCLEAR | NATURAL LIGHT COLOR IMAGE | DEEP LEARNING (MODEL A) |
| | PLASTIC | | DEEP LEARNING (MODEL C) |
| | VINYL | | ARITHMETIC PROGRAM b |
| | ... | ... | ... |

| ALGORITHM | HIGH DEGREE OF POLARIZATION | | | | LOW DEGREE OF POLARIZATION | | | |
| | MATERIAL | | | | MATERIAL | | | |
| | UNCLEAR | PLASTIC | VINYL | ... | UNCLEAR | PLASTIC | ... |
| --- | --- | --- | --- | --- | --- | --- | --- |
| DEEP LEARNING (MODEL A) | k1 | (k4) | k7 | ... | k10 | k13 | ... |
| DEEP LEARNING (MODEL B) | k2 | k5 | k8 | ... | k11 | (k14) | ... |
| ARITHMETIC PROGRAM a | k3 | k6 | k9 | ... | k12 | k15 | ... |
| ... | ... | ... | ... | ... | ... | ... | ... |

240

250

IMAGE PROCESSING APPARATUS AND MATERIAL INFORMATION OBTAINMENT METHOD

CROSS-REFERENCE TO RELATED APPLICATION

The present application is based on PCT filing PCT/JP2021/022129, filed Jun. 10, 2021, the entire contents of which are incorporated herein by reference.

TECHNICAL FIELD

The present invention pertains to an image processing apparatus and a material information obtainment method that are for obtaining material information for a target object by using a captured image.

BACKGROUND ART

A technique for causing an object present in the real world to appear as an object in a virtual world on a display, reflecting an interaction with a user to the virtual world, and fusing the real world with the virtual world is known. A technique that uses a captured image to detect the state of a target object and performs information processing based on this has been introduced in a wide range of fields, such as surveillance cameras, automated driving systems, inspection apparatuses in manufacturing lines, and automatic control robots, in addition to such electronic content. In recent years, due to progress in artificial intelligence, it has become possible to use machine learning or deep learning to accurately recognize a photographic subject from a captured image and identify material thereof (for example, refer to NPL 1).

CITATION LIST

Patent Literature

[NPL 1]
Abhimitra Meka, et al., "LIME: Live Intrinsic Material Estimation," 2018 IEEE/CVF Conference on Computer Vision and Pattern Recognition (CVPR), (USA), 2018, vol. 1, p. 6315-6324

SUMMARY

Technical Problem

A situation for an image of a photographic subject in a captured image can be changed due to the state of light, according to, inter alia, the brightness of the vicinity thereof or the presence or absence of objects. For example, even with the same photographic subject, there are cases where the color or luminance distribution of an image thereof greatly change, or a shape is difficult to recognize due to not being possible to clearly obtain an outline. According to a similar principle, there are cases where it is difficult to, from only a captured image, distinguish between whether an image of a certain target object represents an intrinsic color or shape or whether the image of the certain target object has an obtained figure by chance due to adjustment of light. As a result, there are cases where correct information pertaining to a target object cannot be obtained, and the accuracy of subsequent information processing is worsened. Due to this, a feature that can more accurately identify information regarding a target object by using a captured image is required.

The present invention is made in the light of such a problem, and an objective thereof is to provide a technique that can use a captured image to obtain information regarding a target object with good accuracy.

Solution to Problem

One aspect of the present invention pertains to an image processing apparatus. This image processing apparatus is characterized by being provided with a captured image obtainment unit configured to obtain multiple captured images resulting from using a polarizing camera to capture a target object while causing, for at least any one of the target object and a light source, an angle with respect to an image capturing surface or a state of the light source to differ, a polarization degree obtainment unit configured to obtain a degree of polarization of an image of the target object in each of the captured images, and a material information estimation unit configured to use a captured image selected on the basis of the degree of polarization or an image obtained from the captured image to estimate material information regarding the target object.

Here, it is sufficient if "material information" is a parameter representing a characteristic of a target object that impacts an optical phenomenon on the surface of the target object and, for example, may be any of, inter alia, surface roughness, metalness, or a color of the target object itself, or a combination thereof.

Yet another aspect of the present invention pertains to a material information obtainment method. This material information obtainment method is characterized by including a step of obtaining multiple captured images resulting from using a polarizing camera to capture a target object while causing, for at least any one of the target object and a light source, an angle with respect to an image capturing surface or a state of the light source to differ, a step of obtaining a degree of polarization of an image of the target object in each of the captured images, and a step of using a captured image selected on the basis of the degree of polarization or an image obtained from the captured image to estimate material information regarding the target object.

Note that results of converting optionally-defined combinations of the above components and expressions of the present invention among the method, the apparatus, and so forth are also effective as aspects of the present invention.

Advantageous Effect of Invention

By virtue of the present invention, it is possible to use a captured image to obtain a state of a target object with good accuracy.

BRIEF DESCRIPTION OF DRAWINGS

FIG. 5 is a view that compares results of drawing objects using material information estimated from images in which the same target objects are captured under different conditions.

FIG. 6 is a view that illustrates an example of the structure of an image capturing element with which the image capturing apparatus according to the present embodiment is provided.

FIG. 9 is a view that illustrates a configuration of functional blocks in the image processing apparatus according to the present embodiment.

FIG. 12 is a view that exemplifies a polarization degree table generated by a polarization degree obtainment unit according to the present embodiment.

FIG. 13 is a view that exemplifies setting information for a material information estimation unit according to the present embodiment to switch details of processing, depending on a degree of polarization.

FIG. 14 is a view that exemplifies a deep learning network used when an estimation unit in the material information estimation unit, according to the present embodiment, estimates material information.

FIG. 18 is a view that exemplifies, in a case where multiple sets of material information are estimated in the present embodiment, setting information for the estimation unit to combine these sets and thereby obtain final material information.

DESCRIPTION OF EMBODIMENT

Figure 1:
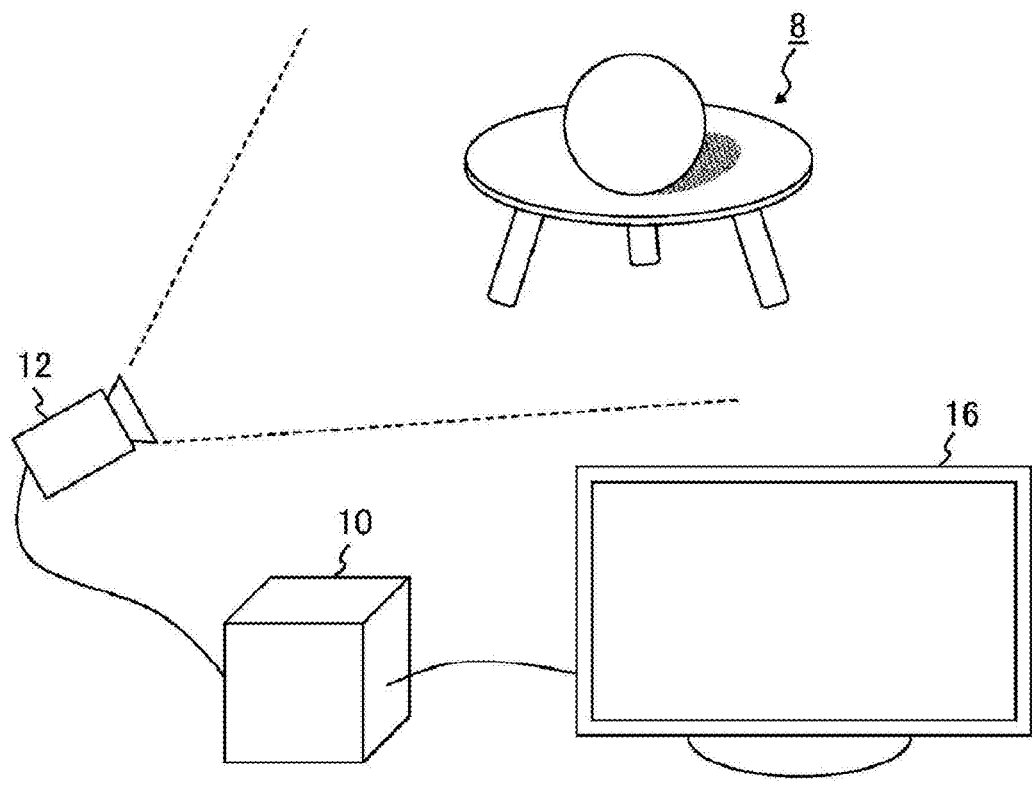
FIG. 1 is a view that illustrates an example of a configuration of an information processing system according to the present embodiment.

FIG. 1 illustrates an example of a configuration of an image processing system according to the present embodiment. This information processing system includes an image capturing apparatus 12 that captures a target object 8, an image processing apparatus 10 that processes the captured image thereof to thereby obtain predetermined information and uses this to perform information processing, and a display apparatus 16 that outputs a result of image processing. The image processing system may further include an input apparatus for accepting an operation with respect to the image processing apparatus 10 from a user. The image processing apparatus 10 may also be able to communicate with an external apparatus such as a server by connecting to a network such as the Internet.

The image processing apparatus 10, the image capturing apparatus 12, and the display apparatus 16 may be connected by a wired cable or may be wirelessly connected such as by a wireless LAN (Local Area Network). In addition, any two or more of the image processing apparatus 10, the image capturing apparatus 12, and the display apparatus 16 may be combined and employed as an integral apparatus. For example, an image processing system may be realized by, inter alia, a camera or a portable terminal which is equipped with these apparatuses. Alternatively, it may be that the display apparatus 16 is employed as a head-mounted display that a user mounts to the head and causes to display an image before the eyes and the image capturing apparatus 12 is provided to the head-mounted display in order to capture an image corresponding to the user's line of sight. In any case, external shapes of the image processing apparatus 10, the image capturing apparatus 12, and the display apparatus 16 are not limited to those illustrated.

In such a system, the image processing apparatus 10, at least, sequentially obtains data of images captured by the image capturing apparatus 12 and obtains material information regarding the target object 8. Here, "material information" is information representing a feature of the surface of the target object, and, for example, is at least any one of the color (albedo color) of the target object itself, surface roughness, metalness, etc. Material information is information that enables realistic representation by computer graphics by performing drawing after using such information to calculate optical phenomena such as light reflection, scattering, refraction, and absorption, and a type or strict definition thereof is not particularly limited if within this category.

The image processing apparatus 10 may output obtained material information itself to the display apparatus 16 or a recording apparatus (not illustrated) or may further perform information processing on the basis of the material information, generate a display image or audio data, and output the display image or audio data to the display apparatus 16. Details of information processing that the image processing apparatus 10 performs on the basis of material information here are not particularly limited. For example, an electronic game in which an object representing the target object 8 appears may be realized. In this case, a player of this game can incorporate its own possession in a game world, move the possession as a character, or use the possession as a controller.

Alternatively, consideration can be given to using material information regarding the target object 8 as a portion of model data for a virtual object. In this case, at a stage when a creator creates content, it is possible to incorporate a desired color or material of a real object as the design of an object, and it is possible to streamline creation work. In such a manner, after being temporarily applied as data for content, material information may be used at any later timing or may be immediately reflected to a display image.

Note that an objective of using material information is not limited to realizing content in conjunction with an image display. For example, material information is used in addition to the shape of an object, whereby it is possible to improve recognition accuracy for a target object. Accordingly, the image processing apparatus 10 may be a target object recognition apparatus in, inter alia, a monitoring system, an in-vehicle camera system, an inspection apparatus, or an autonomous robot. A person skilled in the art would understand that various changes are possible for the configuration of an image processing system, according to an objective of using material information.

Figure 2:
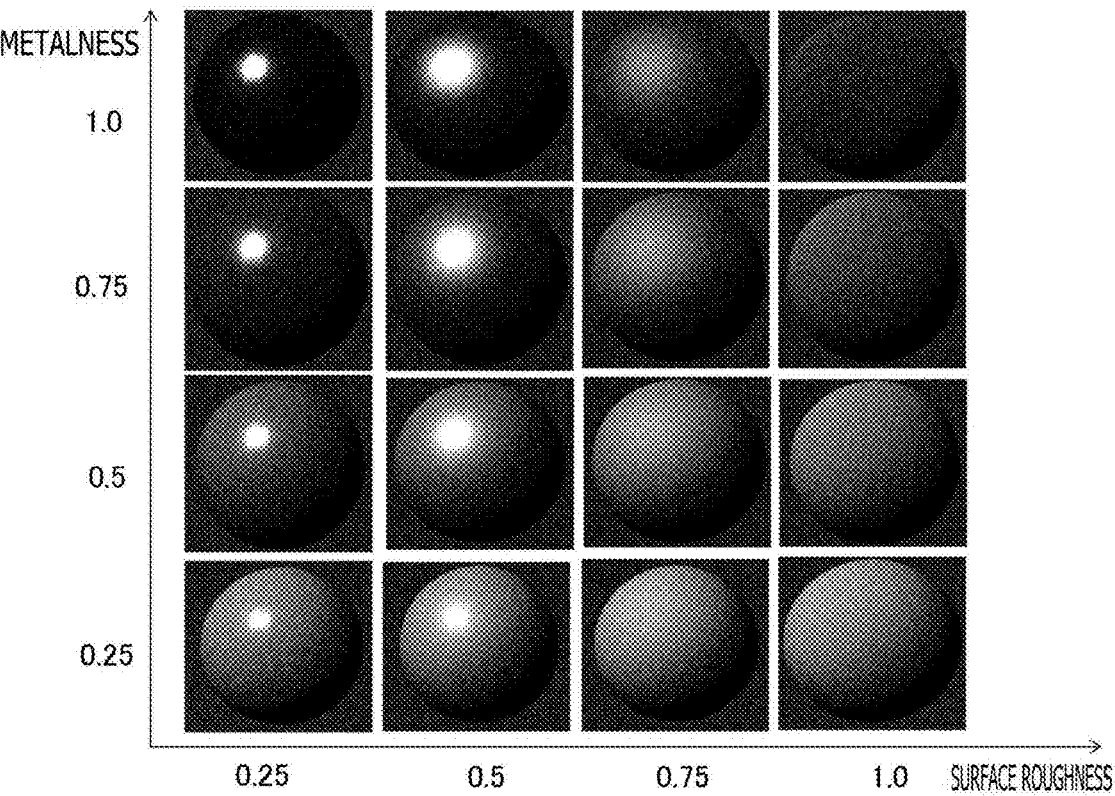
FIG. 2 is a view that exemplifies results in which a sphere is drawn while causing material information to change.

FIG. 2 is a view that exemplifies results in which a sphere is drawn while causing material information to change. In the view, the horizontal axis represents surface roughness, the vertical axis represents metalness, and each of these are caused to change four ways while employing 1.0 as a maximum value, whereby 16 images are illustrated. Here, "surface roughness" indicates variation in height or plane orientation due to unevenness on the micrometer level on the surface of the object, and the variation gets greater as the roughness gets greater. In addition, metalness indicates optical reflectance (reflectivity), and the metalness gets higher as the ratio of specular reflection gets high, from among diffuse reflection and specular reflection.

Here, specular reflection is light subject to regular reflection by an object surface that is irradiated from a light source, and diffuse reflection is light that arrives inside of an object, is scattered by pigment particles, and appears at the surface. By a dichroic reflection model, light observed by the image capturing apparatus 12 is represented by a sum of image capturing surface direction components from among such reflected light. Surface roughness and metalness are parameters that are typically used in the field of computer graphics. Note that "Roughness," which indicates surface roughness, may be used as a parameter such as glossiness or shininess, depending on the definition thereof.

As illustrated, even with the same sphere, the texture thereof greatly changes according to changes in material information. For example, when the metalness increases, diffuse reflection, which represents the color of the object itself (gray in the view), decreases, and only reflection of the illumination is represented at 1.0. In contrast, when the surface roughness increases, a region where specular reflection appears expands while the maximum luminance decreases, and it becomes difficult to distinguish a boundary for illumination reflection at 1.0. In practice, an image aspect also naturally changes according to the color of the sphere itself.

Figure 3:
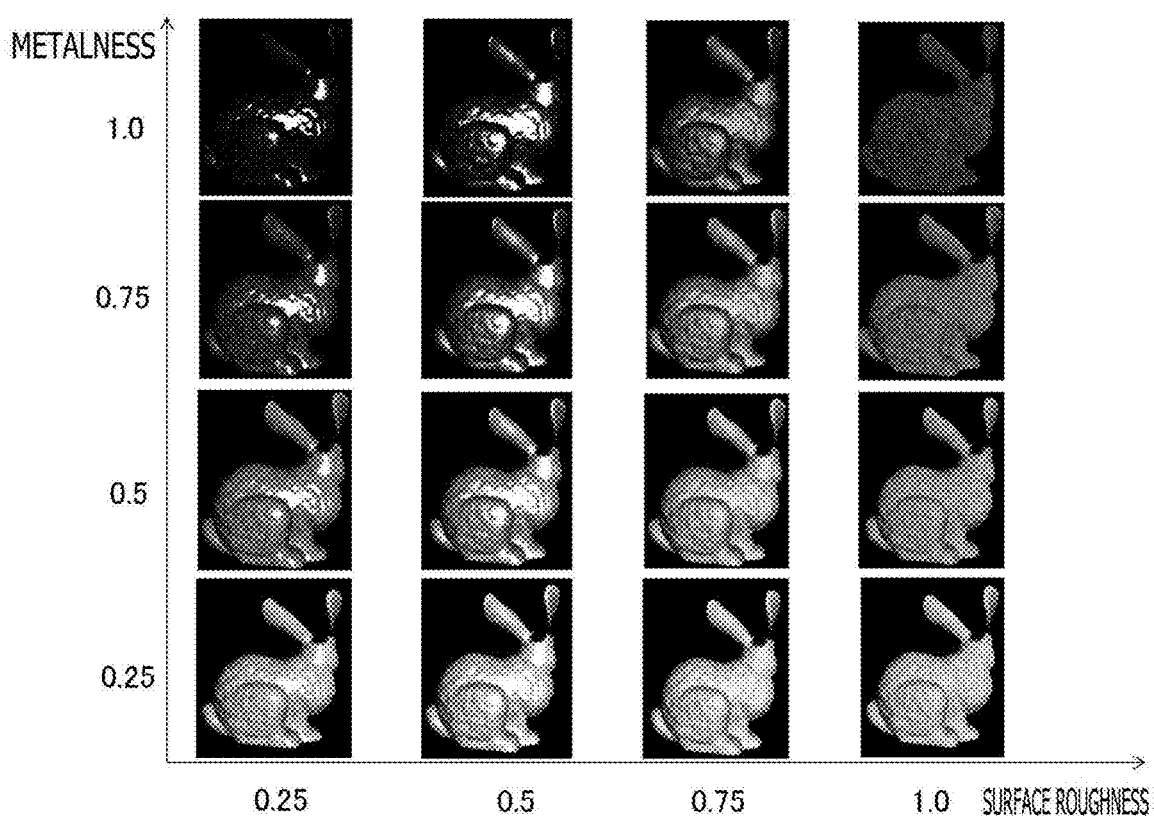
FIG. 3 is a view that illustrates results in which rabbit objects are drawn using the same material information as that in FIG. 2.

FIG. 3 illustrates results in which rabbit objects are drawn using the same material information as that in FIG. 2. For example, a spherical real object as illustrated in FIG. 2 is captured, and material information thereof is applied to a model of a rabbit, whereby a rabbit having various surface conditions as illustrated can be represented as an object.

Figure 4:
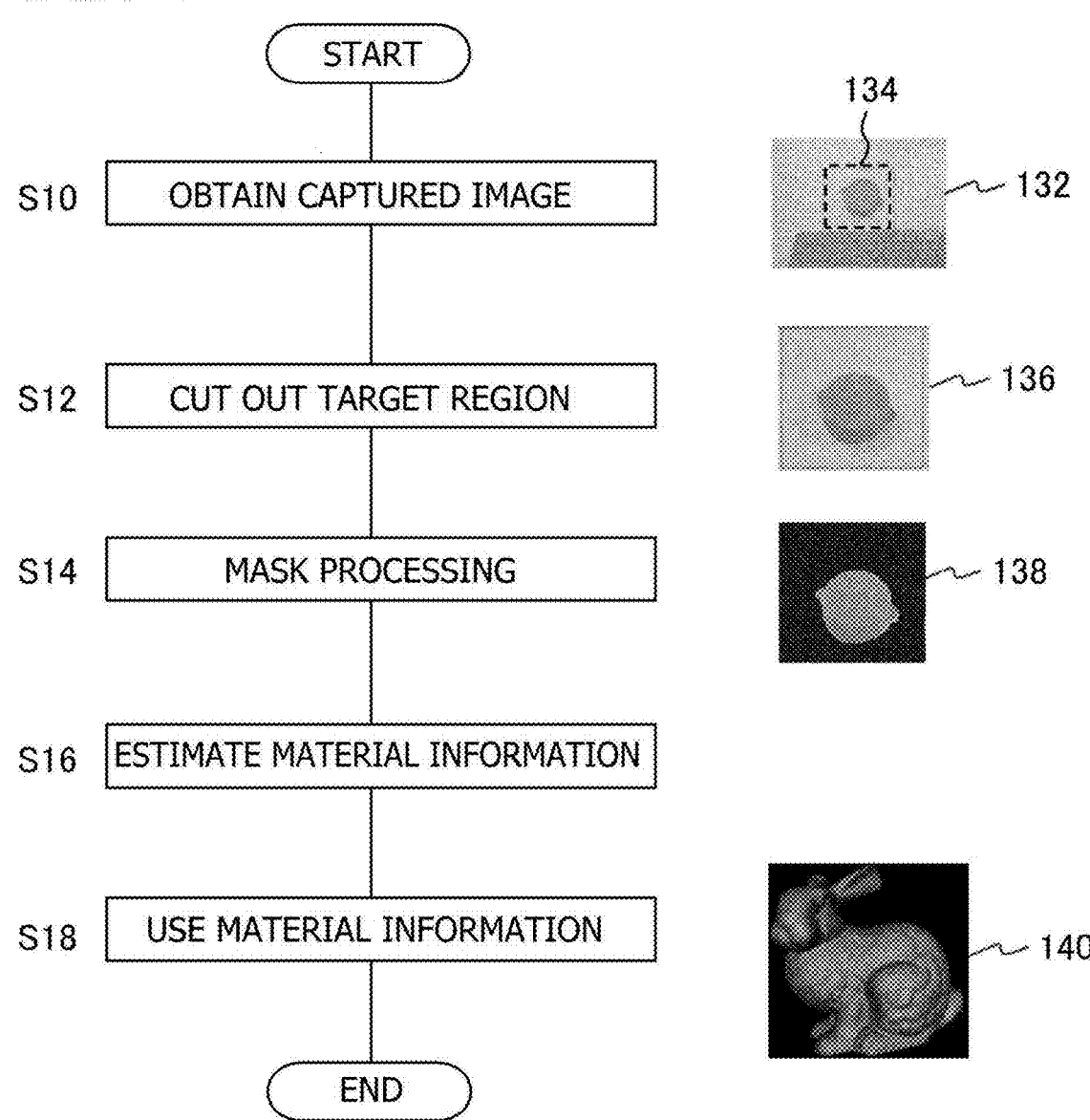
FIG. 4 is a view that illustrates an outline of a processing procedure in which an image processing apparatus according to the present embodiment obtains material information from a captured image and uses the material information.

FIG. 4 illustrates an outline of a processing procedure in which an image processing apparatus 10 obtains material information from a captured image and uses the material information. Firstly, the image processing apparatus 10 obtains an image 132 that is formed by the image capturing apparatus 12 capturing a space that includes a target object (S10). The image processing apparatus 10 obtains a partial image 136 that is formed by cutting out, from among the obtained image 132, a rectangular region 134 in which the target object appears (S12). It may be that this processing is performed by only the image processing apparatus 10 using a typical image processing technique such as pattern matching or is performed by accepting designation of the rectangular region 134 manually.

Next, the image processing apparatus 10, from among the partial image 136, masks a region other than the target object to thereby generate an image 138 in which pixel values are valid only in a region for the target object (S14). It may be that this processing is performed by only the image processing apparatus 10 using a typical image processing technique such as pattern matching or foreground extraction or is performed by accepting designation of an image manually. This image processing apparatus 10 analyzes a region for the image of the target object to thereby estimate material information (S16).

For example, the image processing apparatus 10 estimates material information by using a deep learning network that is constructed in order to estimate material information or by using a predetermined formula. Material information obtained by the image processing apparatus 10 is not limited as described above, but, as a representative example, it is hereinafter assumed that material information estimates the color of an object itself (referred to as an object color), metalness, and surface roughness. The image processing apparatus 10 uses the estimated material information to perform predetermined information processing (S18). For example, the image processing apparatus 10 draws an image 140 of a rabbit that has the same surface condition as the captured target object or draws a display image that includes this.

As described above, the image processing apparatus 10 may draw the image 140 as well as obtain material information or may include the material information in model data for an object to be drawn such as a rabbit and draw the image 140 at any later timing. Depending on the details of the processing performed in S18, while processing from the obtainment of a captured image to the estimation of material information in S10 through S16 is continued, information processing using the material information may be performed in parallel. For example, it may be that, in response to changes in the actual color or surface condition of a target object, an object being displayed is similarly changed. Note that usage of material information in S18 may be performed by an apparatus other than the image processing apparatus 10.

In any case, in the processing mode as illustrated, how to accurately estimate material information from a captured image is a problem. In contrast, a captured image merely represents a portion of an optical phenomenon that occurs at a target object surface. In other words, a large difference arises in information represented by a captured image, depending on, inter alia, the angle of illumination or a target object with respect to an image capturing surface, the presence or absence of illumination, or the type of illumination, and there can be considerable impact on the accuracy of material information. FIG. 5 compares results of drawing objects using material information estimated from images in which the same target objects are captured under different conditions. The upper row has images in which a rectangular plate is captured as a target object, and the lower row has images of rabbits drawn using material information estimated from respective captured images.

Even with a target object having luster on the surface thereof, as illustrated in (a), with a captured image in a state in which illumination is not in direct contact, diffuse reflection becomes dominant for the entirety of the target object, and an image lacking brightness is obtained. As a result, material information having little luster (having low metalness or high surface roughness) is estimated, and the surface of a rabbit that reflects this is drawn in a state where luster is low overall. In contrast, if illumination is applied to a target object and capturing is performed such that a reflection thereof is captured, a region in which specular reflection is dominant occurs for a portion of the image of the target object, as illustrated in (b). As a result, material information indicating intrinsic luster is estimated, and the surface of a rabbit that reflects this is accurately drawn as having luster.

In other words, to accurately estimate luster of a target object as material information, it is necessary for an image in which illumination is specularly reflected to be captured. In contrast, in the captured images illustrated in (b), there are cases where a cause for a portion of an image of a target object being white is that, other than specular reflection, the color of the target object itself is white, and distinguishing therebetween is necessary for the accuracy of material information. Accordingly, in the present embodiment, the image capturing apparatus 12 is employed as a polarizing camera, and information held by a polarized image is used to cause details of an estimating process to adaptively change. For example, polarization information is used to identify an image having many specular reflection components, and this is used to estimate material information. In the example in the figure, the captured images in (b) are selected, whereby it is possible to accurately estimate material information such as metalness or surface roughness, on the basis of more information that is held by the image.

By using polarized images, it is possible to distinguish between a region in which specular reflection is dominant and a region in which diffuse reflection is dominant, and thus, on the basis of the latter, it becomes possible for an object color to be accurately obtained. In addition, according to a reflection characteristic represented by a captured image such as the strength of specular reflection, it is possible to appropriately select an algorithm such as deep learning that is used to estimate material information, or switch types, numbers, or selection policies for images used in estimation. In such a manner, if information pertaining to polarization is introduced and details of processing are switched, it is possible to especially improve the accuracy of estimating material information in comparison to a case of using a captured image of natural light which lacks grounds for switching.

FIG. 6 illustrates an example of the structure of an image capturing element with which the image capturing apparatus 12 according to the present embodiment is provided. Note that the same figure schematically illustrates a functional structure of an element cross-section, and detailed structure such as an interlayer electrically-insulating film or wiring is omitted. An image capturing element 110 includes a micro lens layer 112, a wire grid polarizer layer 114, a color filter layer 116, and a photodetection layer 118. The wire grid polarizer layer 114 includes a polarizer in which multiple linear conductor members are arranged in stripe shapes at intervals shorter than the wavelength of incident light. When light condensed by the micro lens layer 112 is incident on the wire grid polarizer layer 114, a polarization component having an orientation parallel to lines in the polarizer is reflected, and only an orthogonal polarization component is transmitted.

The transmitted polarization component is detected by the photodetection layer 118, whereby a polarized image is obtained. The photodetection layer 118 has the structure of a semiconductor element, such as a typical CCD (Charge Coupled Device) image sensor or a CMOS (Complementary Metal Oxide Semiconductor) image sensor. The wire grid polarizer layer 114 includes an array of polarizers in which a main axis angle differs, in charge reading units for the photodetection layer 118, in other words, pixel units, or in units greater than these. The right side of the same figure exemplifies a polarizer array 120 when the wire grid polarizer layer 114 is seen from the top surface thereof.

In the same figure, shaded lines are conductors (wires) that are included in a polarizer. Note that dotted-line rectangles each represent a region for a polarizer having one main axis angle, and the dotted lines themselves are not formed in practice. In the illustrated example, four polarizers having four different main axis angles are disposed in four regions 122a, 122b, 122c, and 122d on two rows and two columns. In the figure, the main axis angles of polarizers on a diagonal are orthogonal, and adjacent polarizers have a 45° difference. In other words, polarizers for four main axis angles at every 45° are provided.

Each polarizer transmits a polarization component in a direction orthogonal to the direction of the wires. As a result, in the photodetection layer 118 provided below, it is possible to obtain polarization information for four orientations at every 45° in respective regions that correspond to the four regions 122a, 122b, 122c, and 122d. A predetermined number of such a polarizer array having four main axis angles are further arranged in the vertical direction and the horizontal direction for the image capturing surface, and a peripheral circuit for controlling a charge readout timing is connected, whereby it is possible to realize an image sensor that simultaneously obtains four types of polarization information as two-dimensional data.

The image capturing element 110 illustrated in the same figure is provided with a color filter layer 116 between the wire grid polarizer layer 114 and the photodetection layer 118. The color filter layer 116 includes an array of filters that respectively transmit red, green, and blue light in association with respective pixels, for example. As a result, polarization information is obtained by color, according to a combination of the main axis angles of the polarizers in the wire grid polarizer layer 114 with the colors of the filters in the color filter layer 116, which are positioned vertically. In other words, polarization information for the same orientation and the same color is discretely obtained on an image plane, and thus, this is appropriately interpolated, whereby a polarized image for each orientation and each color is obtained.

In addition, it is possible to reproduce a natural light (unpolarized) color image by performing a computation on polarized images having the same color as one another. For example, Japanese Patent Laid-open No. 2012-80065 or the like discloses an image obtainment technique using a wire grid polarizer. However, the element structure of the image capturing apparatus 12 according to the present embodiment is not limited to that illustrated. In addition, a polarizer is not limited to a wire grid type, and may be anything put to practical use, such as a linear dichroic polarizer. Alternatively, it may be that a structure in which a polarizing plate is disposed at the front surface of a typical camera is employed, and image capturing is performed while causing the polarizing plate to rotate such that the main axis angle changes, whereby polarized images for multiple orientations may be obtained.

It is known that behavior with respect to orientation for polarization luminance changes depending on the material and the orientation of a subject surface with respect to an image capturing surface. The luminance of light observed via a polarizer changes as in the following formula with respect to a main axis angle $\theta_{pol}$ of the polarizer.

[Math. 1]

$$I = \frac{I_{max} + I_{min}}{2} + \frac{I_{max} - I_{min}}{2} \cos(2(\theta_{pol} - \phi)) \qquad \text{(Formula 1)}$$

Here, $I_{max}$ and $I_{min}$ are respectively a maximum value and a minimum value of observed luminance, and $\varphi$ is a polarization phase. In a case where polarized images are obtained with respect to four main axis angles $\theta_{pol}$ as described above, a luminance I of a pixel at the same position satisfies Formula 1 with respect to each main axis angle $\theta_{pol}$. Accordingly, it is possible to use, inter alia, least squares to approximate a curve passing through these coordinates (I, $\theta_{pol}$) to a cosine function and thereby obtain $I_{max}$, $I_{min}$, and $\varphi$. Using the $I_{max}$ and $I_{min}$ obtained in this manner, a degree of polarization $\rho$ can be obtained using the following formula.

[Math. 2]

$$\rho = \frac{I_{max} - I_{min}}{I_{max} + I_{min}} \qquad \text{(Formula 2)}$$

Note that, in a case where polarized images for times where the main axis angle $\theta_{pol}$ is 0°, 45°, 90°, and 135° are obtained due to, inter alia, the image capturing element illustrated in FIG. 6 and the luminance thereof is $y_0$, $y_{45}$, $y_{90}$, and $y_{135}$, Formula 1 can be expressed as a function of luminance y in which a main axis angle x is employed as a variable.

[Math. 3]

$$y = c + \sqrt{a^2 + b^2} \cos 2(x - \phi) \qquad \text{(Formulae 3)}$$

$$a = \frac{1}{2}(y_{45} - y_{135})$$

$$b = \frac{1}{2}(y_0 - y_{90})$$

$$c = \frac{1}{4}(y_0 + y_{45} + y_{90} + y_{135})$$

When the Formulae 3 are used, the degree of polarization $\rho$ can be obtained as follows.

[Math. 4]

$$\rho = \frac{\sqrt{a^2 + b^2}}{c} \qquad \text{(Formula 4)}$$

When the degree of polarization $\rho$ is 1, observed light is completely polarized light (linearly-polarized light) that vibrates in one direction. When the degree of polarization $\rho$ is 0, there is unpolarized light which vibrates isotropically. Apart from that, the degree of polarization $\rho$ changes between 0 and 1 due to a degree of deviation in the vibration. By virtue of the dichroic reflection model as described above, a spectrum of reflected light is represented by the linear combination of the spectrums of specular reflection and diffuse reflection. A ratio between a specular reflection component and a diffuse reflection component included in reflected light also depends on the material of the object that reflects.

Figure 7:
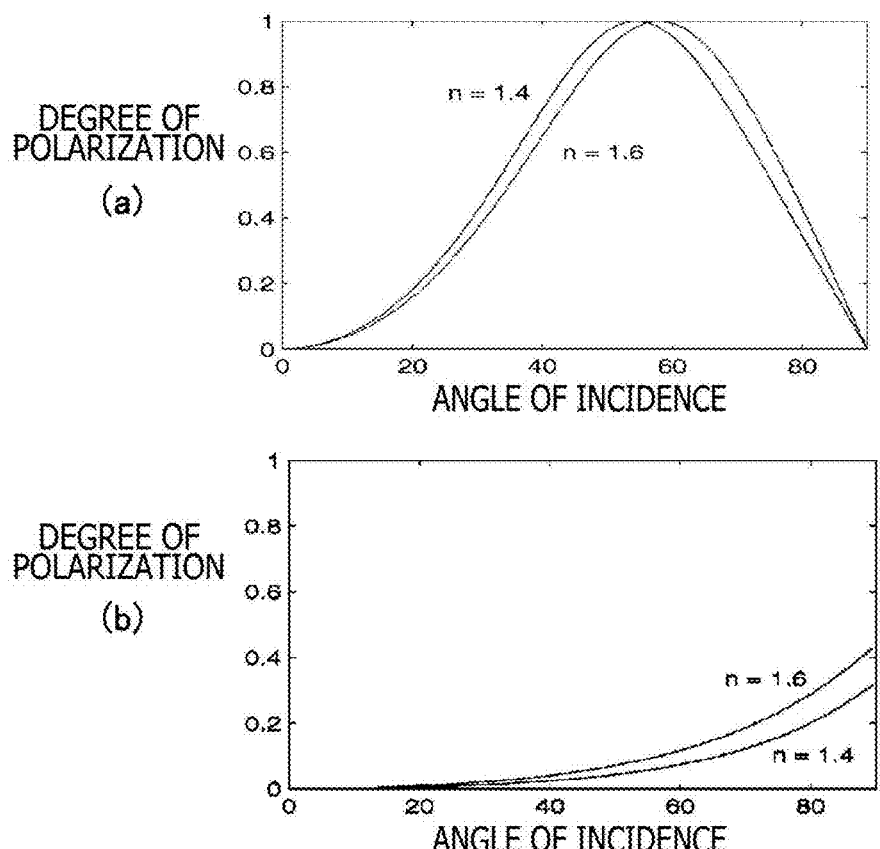
FIG. 7 is a view that compares change in a degree of polarization with respect to an angle of incidence, between specularly reflected light and diffusely reflected light.

FIG. 7 compares change in a degree of polarization with respect to an angle of incidence, between specularly reflected light and diffusely reflected light. Note that refractive indexes n of objects that reflect are assumed to be 1.4 and 1.6. Regardless of the refractive index, the specularly reflected light illustrated in (a) has an especially large degree of polarization in a range of a large portion of angles of incidence, in comparison to the diffusely reflected light illustrated in (b). In other words, the degree of polarization becomes an indicator that represents the strength of specular reflection. Accordingly, from polarized images, which are for multiple orientations and are obtained from the image capturing apparatus 12, the image processing apparatus 10 according to the present embodiment obtains a degree of polarization for an image of a target object or obtains a distribution for a degree of polarization, estimates the strength of specular reflection on the basis of this, and then causes details of processing pertaining to estimation of material information to change. Note that, by virtue of Formula 2, the difference between the maximum value and the minimum value for polarization luminance ($I_{max} - I_{min}$) may be used as an indicator that represents the strength of specular reflection, in place of the degree of polarization $\rho$.

Figure 8:
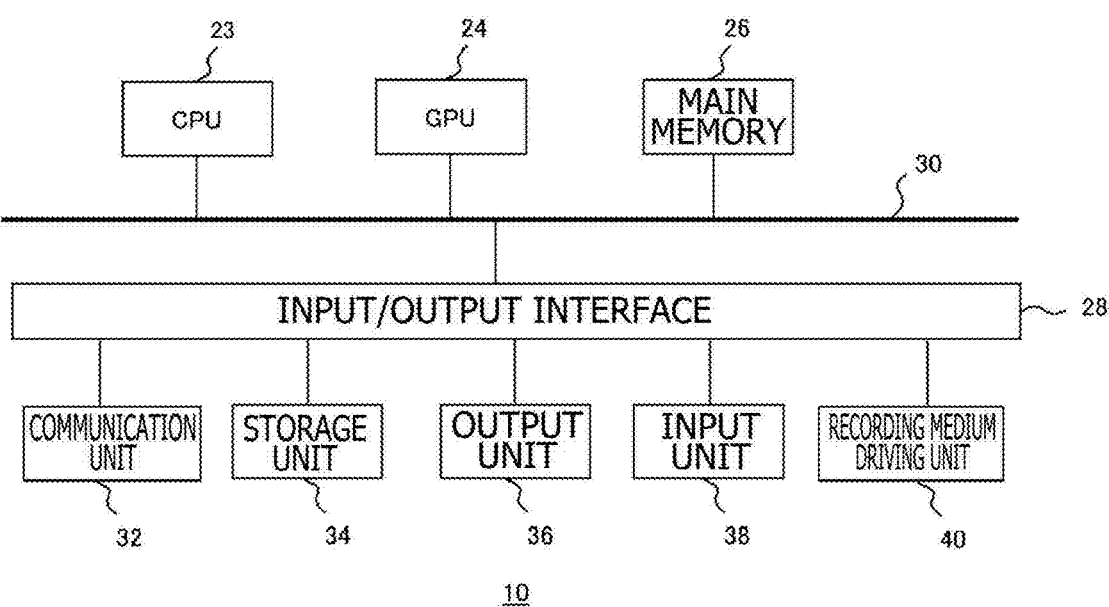
FIG. 8 is a view that illustrates an internal circuit configuration of the image processing apparatus according to the present embodiment.

FIG. 8 illustrates an internal circuit configuration of the image processing apparatus 10. The image processing apparatus 10 includes a CPU (Central Processing Unit) 23, a GPU (Graphics Processing Unit) 24, and a main memory 26. These units are connected to each other via a bus 30. An input/output interface 28 is also connected to the bus 30. Connected to the input/output interface 28 are a communication unit 32 that includes a peripheral interface for USB (Universal Serial Bus), IEEE (Institute of Electrical and Electronic Engineers) 1394, or the like or a network interface for a wired or wireless LAN, a storage unit 34 that is a hard disk drive, a non-volatile memory, or the like, an output unit 36 that outputs data to the display apparatus 16, an input unit 38 that inputs data from the image capturing apparatus 12 or an unillustrated input apparatus, and a recording medium driving unit 40 that drives a removable recording medium such as a magnetic disk, an optical disk, a semiconductor memory, or the like.

The CPU 23 executes an operating system stored in the storage unit 34 to thereby control the entirety of the image processing apparatus 10. The CPU 23 also executes various programs that are read out from a removable recording medium and loaded into the main memory 26 or are downloaded via the communication unit 32. The GPU 24 has a geometry engine function and a rendering processor function, performs a drawing process according to a drawing instruction from the CPU 23, and stores data for a display image in an unillustrated frame buffer. The display image stored in the frame buffer is converted to a video signal and outputted to the output unit 36. The main memory 26 includes a RAM (Random-Access Memory) and stores a program and data that are necessary for processing.

FIG. 9 illustrates a configuration of functional blocks in the image processing apparatus 10 according to the present embodiment. In terms of hardware, each functional block illustrated in the same figure can be realized by various circuits that are illustrated in FIG. 8, and, in terms of software, is realized by a program that is loaded from, inter alia, a recording medium to a memory and exhibits various functions such as a data input function, a data retention function, an arithmetic function, an image processing function, or a communication function. Accordingly, a person skilled in the art would understand that these functional blocks can be realized in various forms by only hardware, only software, or a combination thereof and are not limited to one of these.

The image processing apparatus 10 includes a captured image obtainment unit 50 that obtains data for a captured image from the image capturing apparatus 12, an image data storage unit 52 that stores the data for the obtained image, a polarization degree obtainment unit 54 that obtains a degree of polarization of an image of a target object, a material information estimation unit 56 that estimates material information for a target object, a material information storage unit 58 that stores the estimated material information, and an output data generation unit 60 that, on the basis of the material information, generates data to be outputted.

Note that, from among the illustrated configuration of the image processing apparatus 10, all of these do not need to be integrally provided. For example, the polarization degree obtainment unit 54 may be a portion of the image capturing apparatus 12. As described above, a function for estimating material information from a captured image and a function for using the material information to generate a display image may be realized by different apparatuses, and timings for causing these functions to operate may be independent. In this case, the output data generation unit 60, which corresponds to a function for generating an image that the display apparatus 16 is to be caused to display, may be configured as a separate apparatus. Furthermore, a portion of the functions of the material information estimation unit 56 may be realized by, inter alia, a server connected to the image processing apparatus 10 via a network. For example, a deep learning function provided by cloud computing may be used to estimate material information.

The captured image obtainment unit 50 obtains, from the image capturing apparatus 12, data for a polarized image that has captured a space that includes a target object. This processing corresponds to S10 in FIG. 4.

Alternatively, the captured image obtainment unit 50 may obtain data for a polarized image that has been temporarily stored, such as in a recording medium or a storage apparatus. In any case, the captured image obtainment unit 50 obtains data for polarized images that have multiple orientations and result from capturing the target object from one or more viewpoints. In a case of estimating the color of the target object itself as material information, color images are employed for the polarized images.

The captured image obtainment unit 50 desirably obtains data for polarized images captured under multiple states (hereinafter, referred to as image capturing states) in which at least any one of an angle with respect to an image capturing surface for at least any one of the target object and a light source and the state of the light source differ. As a result, it is possible to select an image that conforms to a predetermined condition, such as an image having many specular reflection components or an image having many diffuse reflection components, and it is possible to improve the accuracy of estimating material information. A change of an image capturing state can be realized by at least any one of a change to the position or orientation of the image capturing apparatus 12, a change to the position or orientation of the target object, and a change to luminance including the position or direction of the light source direction and whether the light source is on or off.

At this time, the captured image obtainment unit 50 may, via an illustrated control apparatus, control the position, orientation, direction, and state of at least any one of the image capturing apparatus 12, the target object, and the light source such that images having different image capturing states are captured. The captured image obtainment unit 50 may control the image capturing apparatus 12 to capture a still image after setting such predetermined image capturing states, or the captured image obtainment unit 50 may cause an image capturing state to change in parallel with the image capturing apparatus 12 capturing a moving image. In the latter case, the captured image obtainment unit 50 obtains data for the moving image captured in such a manner, and then extracts multiple frames that satisfy a predetermined condition such as a difference in the image capturing state.

Alternatively, the captured image obtainment unit 50 may, via the display apparatus 16 or the like, supply a user with an instruction to suitably change an image capturing state. Hereinafter, polarized images that have multiple orientations and are captured under one image capturing state may be referred to as a "polarized image set." The image data storage unit 52 sequentially stores data for polarized images obtained by the captured image obtainment unit 50. At this point, if necessary, the captured image obtainment unit 50 may generate and store data necessary for subsequent-stage processing, such as a natural light color image. Here, the natural light color image is, for example, obtained by averaging pixel values in the polarized images having the multiple orientations. In a case of obtaining polarized images in which the main axis angle $\theta_{pol}$ is 0°, 45°, 90°, and 135°, it may be that a variable c in Formulae 3 is calculated by respective RGB components.

The polarization degree obtainment unit 54 uses polarized images that have multiple orientations and are stored in the image data storage unit 52 to obtain a degree of polarization for an image of a target object, according to a computation of Formula 2 or Formula 4. The degree of polarization can be calculated for each pixel, and thus a distribution of the degree of polarization in an image plane is obtained by the polarization degree obtainment unit 54. As preceding-stage processing, the polarization degree obtainment unit 54 may, as in S12 and S14 in FIG. 4, cut out a target region from each polarized image and perform a mask process to thereby obtain a distribution of degrees of polarization with respect to a region for an image of the target object. Alternatively, it may be that, after cutting out a target region as in S12, a distribution for degrees of polarization is obtained and then a region other than the image of the target object is masked.

The polarization degree obtainment unit 54 stores a distribution of degrees of polarization in the region of the image of the target object or an average value thereof in the image data storage unit 52, in association with data regarding the original polarized image. In a case where multiple polarized image sets that have been captured under different image capturing state are obtained, the polarization degree obtainment unit 54 may create a table that associates identification information for a polarized image set with a distribution or average value of degrees of polarization and may store the table in the image data storage unit 52.

The material information estimation unit 56 estimates material information regarding a target object by details of processing which corresponds to the degree of polarization of an image of the dealing object. In other words, the processing in S16 in FIG. 4 is performed according to collaboration with the polarization degree obtainment unit 54. For example, the following may be given as details of processing that are caused to differ according to the degree of polarization.

1. Image used for estimation
2. Region within image used for estimation
3. Type of image used for estimation
4. Algorithm used in estimation The material information estimation unit 56 optimizes one or more of the abovementioned details of processing according to the degree of polarization, and then estimates material information. It is possible to omit, as appropriate, some illustrated functionality included in the material information estimation unit 56, according to which details are optimized by the material information estimation unit 56. The material information estimation unit 56 includes an image selection unit 62 for selecting an image to use in estimation, an algorithm switching unit 64 for switching algorithms used in estimation, and an estimation unit 66 for estimating material information. The image selection unit 62 selects at least any one of the abovementioned 1 through 3.

In a case of selecting an image itself used in estimation (hereinafter, may be referred to as an "input image"), the image selection unit 62 selects, on the basis of the degree of polarization, an image that greatly reflects material information that is to be finally obtained. Qualitatively, when metalness or surface roughness is obtained, the image selection unit 62 selects an image that includes many specular reflection components and has a high degree of polarization. When an object color is obtained, the image selection unit 62 selects an image that includes many diffuse reflection components and has a low degree of polarization. However, in a case of using an image captured under one image capturing state to simultaneously obtain these items of material information, an image that includes many specular reflection components and has a high degree of polarization is selected, whereby there is a high possibility of being able to also use a region to identify an object color without losing information regarding metalness or surface roughness.

Accordingly, the image selection unit 62 may, as appropriate, cause a selection condition to change according to the number of images used to estimate material information. For example, in a situation where it is possible to use images captured under three or more image capturing states, images where the degree of polarization is maximum, minimum, and in-between are selected. It is possible to increase the accuracy of estimating material information by selecting images while distributing the degrees of polarization. Conversely, the image selection unit 62 may, according to the magnitude of an obtained degree of polarization, change the number of images used to estimate material information. For example, in a case where a degree of polarization is less than or equal to a predetermined value regardless of the image capturing state, it can be considered that the target object is a material which lacks luster that is less likely to be specularly reflected.

In this case, the image selection unit 62 may select any one input image. In contrast, it may be that the number of input images is increased as the width in change of degrees of polarization gets greater. Note that input images to be selected under the abovementioned 1 do not need to be the polarized image set itself that is used for selection. In other words, they may be images of a predetermined type from among various types of images obtained from the polarized image set, such as a natural light color image obtained from the polarized image set, an image of only a specular reflection component that has been separated using a polarized image, or an image of only a diffuse reflection component. That is, putting the abovementioned 1 into other words, it can be said that the degree of polarization is used to select an image capturing state for an input image.

Meanwhile, the image selection unit 62 may further select a region that is used to estimate material information, from among an image under the selected image capturing state, as in the abovementioned 2. In this case, the image selection unit 62 refers to a distribution of the degree of polarization in an image of the target object and uses predetermined criteria to select a region having a high degree of polarization and a region having a low degree of polarization, for example. A selection principle at this time is similar to that for the abovementioned 1. The image selection unit 62 may first select an image having a difference in degrees of polarization depending on the region, and then further select a region having a high degree of polarization and a region having a low degree of polarization.

Alternatively, the image selection unit 62 may select an image capturing state as in the abovementioned 1, and then further select a type of input image as in the abovementioned 3, on the basis of the degree of polarization. For example, the image selection unit 62 selects one or more images of a type suitable for estimating material information, from among polarized images, natural light images, specular reflection images, diffuse reflection images, etc. As an example, by virtue of experiment by the inventors, it has been determined that, in a case where an image having a high degree of polarization and many specular reflection components is obtained, a specular reflection image formed by separating only the specular reflection component is used to thereby be able to estimate metalness or surface roughness with good accuracy. A specular reflection image may be approximated by the above-described difference between the maximum value and the minimum value for polarization luminance $(I_{max}-I_{min})$, or any calculation model for separating a specular reflection component and a diffuse reflection component from a polarized image may be employed (for example, refer to PCT Patent Publication No. WO2007/029446).

The image selection unit 62 selects a type of input image according to the degree of polarization and generates an image of this type (for example, a specular reflection image) if necessary. Images of different types may be selected according to regions from among an image in one image capturing state, such as a region having many specular reflection components or a region having many diffuse reflection components. Note that, in a case where information regarding the target object obtained apart from the degree of polarization, the image selection unit 62 may use this information to select an input image or determine a selection policy therefor. For example, in a case where an approximate material for the target object, such as wood, metal, pottery, plastic, paper, or cloth is determined in advance, this is used to select an input image.

Specifically, in a case of a material for which there is a high possibility of having luster at the surface thereof such as metal or plastic, an image having a high degree of polarization and an image having a low degree of polarization and consequently an image having many specular reflection components and an image having few specular reflection components are selected. The former may use a specular reflection image as an input image. As a result, it is possible to estimate, with good accuracy, metalness, surface roughness, and an object color. In contrast, in a case of a material having a high possibility of poor luster, such as wood or cloth, the degree of polarization will be low regardless of the image capturing state, and a natural light image in any image capturing state is selected. It may be that the degree of polarization and the approximate material are combined to estimate metalness or surface roughness and then an input image is selected.

Alternatively, the image selection unit 62 may select an input image after taking into account the type or state of a light source. For example, under illumination such as an environment where sunlight is directly coming down at a time of sunny weather or with an LED (light emitting diode) having high directivity, there is a high possibility that an image having strong specular reflection will be obtained, and thus a threshold for a degree of polarization is increased in order to accurately narrow down such images. In addition, because the accuracy of separating a specular reflection component increases, a specular reflection image is generated and set to an input image, whereby the accuracy of estimating material information improves. In addition, the image selection unit 62 may identify an angle of the target object or the light source with respect to the image capturing surface and select the input image by taking this into account. Hereinafter, information that pertains to the target object or illumination and is obtained apart from the degree of polarization is referred to as "additional information."

The image selection unit 62 may, via the output data generation unit 60, cause the display apparatus 16 to display a registration screen for additional information to thereby accept registration from a user. Alternatively, the image selection unit 62 itself may obtain additional information on the basis of, inter alia, measurement values obtained from various sensors or a captured image that is obtained separately. In a case of switching an algorithm used to estimate material information as in the abovementioned 4, the algorithm switching unit 64 uses an image obtained by the captured image obtainment unit 50 or an image selected by the image selection unit 62 to select, on the basis of a degree of polarization, an algorithm with which material information will be accurately obtained.

Accordingly, for example, the algorithm switching unit 64 sets in advance a table that associates a range for degrees of polarization and an estimation algorithm likely to be accurate with respect to an image belonging to this range. An estimation algorithm here is, in a case of deep learning, any of a network that configures this and a database that has learning results, or a combination of these. Alternatively, a formula for calculating material information may be prepared as the estimation algorithm.

As deep learning, in addition to the network disclosed in NPL 1, various models have been developed, such as a CNN (Convolutional Neural Network) referred to as a VGG (Visual Geometry Group) 16 model widely known in fields such as image recognition (refer to K. Simonyan, et al., "Very Deep Convolutional Networks for Large-Scale Image Recognition," [online], 2015, International Conference on Learning Representations, [retrieved on Jun. 3, 2021], Internet <URL: https://arxiv.org/abs/1409.1556>), and any one of these may be employed.

In a case of using deep learning, there are various trends for the accuracy of estimating material information, due to a network configuration, images for training, as well as a database used. To put it most simply, in a case where a network or database likely to have high accuracy for an image having many specular reflection components and a network or database likely to have high accuracy for an image having many diffuse reflection components are prepared, the former is used if an image having a high degree of polarization is obtained and the latter is selected if an image having a low degree of polarization is obtained.

When two images that are different in degree of polarization are obtained, these may be inputted to separate networks or may be inputted to one network with which accuracy is obtained across both of these. If three or more input images are selected, these may be inputted to respectively different networks, or some or all of these may be inputted to the same network. In some cases, one input image may be inputted to multiple networks. The algorithm switching unit 64 may switch algorithms in response to, inter alia, an image type, a selection policy, or a characteristic of an image selected by the image selection unit 62.

In addition, similarly to the image selection unit 62, the algorithm switching unit 64 may use additional information that is obtained apart from the degree of polarization to select an algorithm. In other words, the algorithm switching unit 64 may select an algorithm that can estimate material information with high accuracy with respect to a range or details of additional information. In this case, an estimation algorithm with which high accuracy will be obtained with respect to the combination of the degree of polarization and the additional information is set.

In any case, multiple algorithms to use in material information estimation are prepared and adaptively used on the basis of, inter alia, the degree of polarization, whereby it is possible to increase the accuracy of the material information as much as possible. In addition, in a case of using deep learning, models are separately used according to characteristics of an inputted image, whereby improvement is obtained if databases specialized for respective characteristics are prepared. As a result, there ceases to be a need to train on an enormous amount of data for the purpose of generalizability, and it is possible to simplify databases or estimation processing.

The estimation unit 66 uses the algorithm designated by the algorithm switching unit 64 to analyze an input image selected by the image selection unit 62 and thereby estimate material information. In a case where multiple results are derived due to using multiple input images or algorithms, the estimation unit 66 combines these to determine final material information. For example, in a case where respective estimation results are produced for multiple input images, regardless of the estimation algorithm, the estimation unit 66 increases a weighting coefficient to impart to the results as the degree of polarization of an input image gets high, and then performs a weighted average of the multiple results. This is because, as described above, the specular reflection component is larger as the degree of polarization gets high, and it is easier to obtain more information.

Alternatively, the estimation unit 66 may perform a weighted average of the multiple results using a weighting coefficient determined on the basis of a combination of the degree of polarization of an image used in estimation and the estimation algorithm. For example, as the degree of polarization gets high, a weight is increased for an estimation result using an algorithm for which high estimation accuracy is obtained with respect to specular reflection. Conversely, as the degree of polarization gets low, a weight is increased for an estimation result using an algorithm for which high estimation accuracy is obtained with respect to diffuse reflection. In a case where the approximate material of a target object is determined, a result is selected according to compatibility with an algorithm. Alternatively, additional information is used to adjust a weight to allocate to each algorithm, and then a weighted average of estimation results is calculated. In these cases, a range of degrees of polarization and a range or details of additional information are set to the estimation unit 66 in association with, inter alia, how likely accuracy is produced by each algorithm, and are used to calculate weighting coefficients.

Alternatively, the estimation unit 66 may visualize multiple estimation results and allow a user to select an optimal one. For example, the estimation unit 66, via the output data generation unit 60, causes the display apparatus 16 to display results in which a target object is drawn using multiple items of material information which are estimation results and accepts a user operation for selecting an image that is close to the real target object from among these. Alternatively, it may be that a user is allowed to use, inter alia, a five-grade score to evaluate to what degree each image is close to the real target object, to thereby determine weights for results, and then calculate a weighted average. In this case, a comprehensive evaluation for all items of material information may be accepted, or an evaluation for each parameter such as object color, metalness, and surface roughness may be accepted.

The estimation unit 66 stores material information that was finally determined in the material information storage unit 58. The output data generation unit 60 uses material information read out from the material information storage unit 58 to draw an object that reflects this or a display image that includes this and causes the display apparatus 16 to display the object or display image. As described above, various considerations can be given for the object, and model data apart from material information is stored in the output data generation unit 60. In addition, the output data generation unit 60 may generate, as appropriate, an image for accepting, inter alia, an image capturing start request, various designations for image processing, registration of additional information, or evaluation of material information from a user, or an image for supplying a user with an instruction to change an image capturing state and may cause the display apparatus 16 to display such an image.

Figure 10:
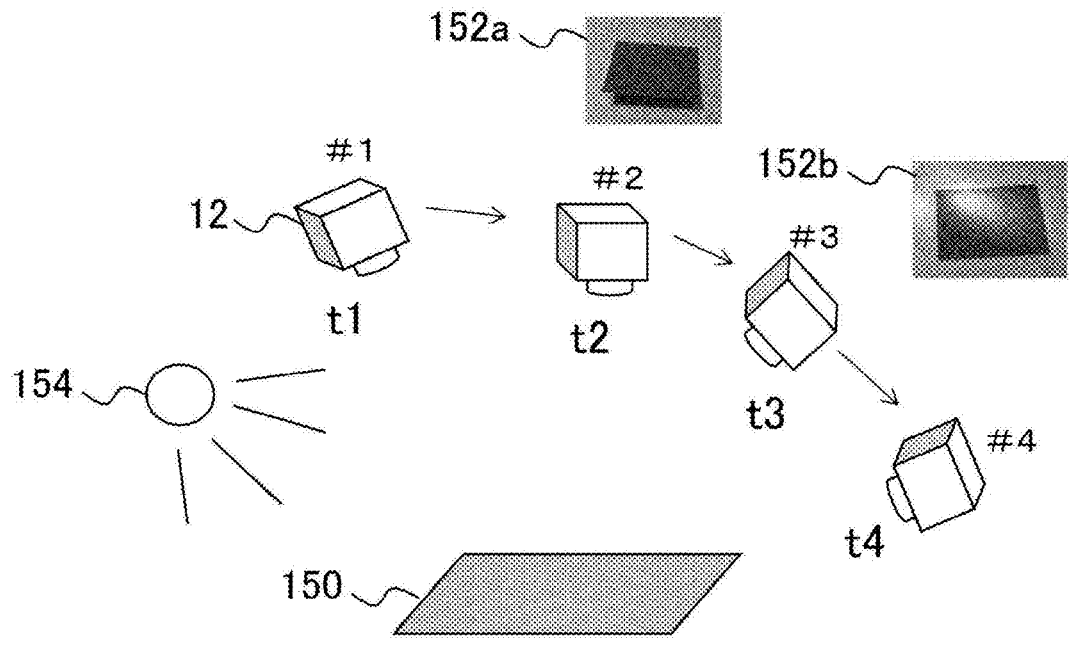
FIG. 10 is a view for describing captured images that are obtained in the present embodiment.

FIG. 10 is a view for describing captured images that are obtained in the present embodiment. According to, inter alia, control by the image processing apparatus 10, the image capturing apparatus 12 captures polarized images of a target object 150 at timings for times t1, t2, t3, and t4 while changing the position or the orientation as indicated by arrows. The identification numbers #1, #2, #3, and #4 are imparted to images captured at respective times and consequently to image capturing states. The angle of at least any one of the target object 150 and a light source 154 with respect to an image capturing surface differs, whereby the size of a specular reflection component in a captured image changes. In the example in the figure, there is little specular reflection in an image 152a at #2, but strong specular reflection is obtained in an image 152b at #3.

The position and orientation of the image capturing apparatus 12 are caused to change in this example, but similar captured images are obtained even if, apart from the image capturing apparatus 12, the position or orientation of the target object 150, the state of the light source 154, or the like is caused to change. The image processing apparatus 10 or a user causes at least any one of the image capturing apparatus 12, the target object 150, and the light source 154 to change such that a different image capturing state is achieved. In a case where the image processing apparatus 10 performs control, a mechanism such as a robot for remote control is attached to an apparatus or object that is to be a subject. In addition, control may be performed such that capturing is performed in a state where illumination which corresponds to the light source 154 is turned on and in a state where illumination is turned off.

Figure 11:
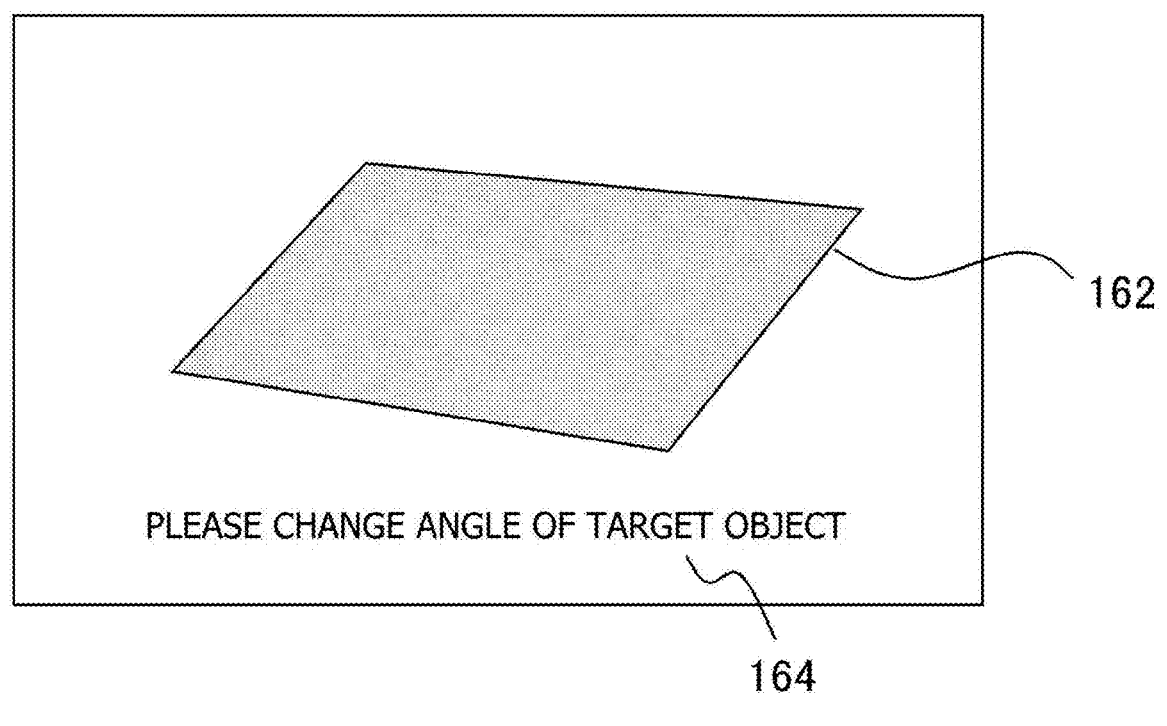
FIG. 11 is a view that exemplifies an instruction screen for causing a user to change the angle of a target object, in the present embodiment.

FIG. 11 exemplifies an instruction screen for causing a user to change the angle of a target object. In this case, the captured image obtainment unit 50 in the image processing apparatus 10 causes display of an instruction screen 160 via the output data generation unit 60. The illustrated instruction screen 160 displays a real-time image that includes an image 162 of a target object that the image capturing apparatus 12 is capturing, as well as instruction text 164 such as "please change an angle of the target object." A user causes the angle of the target object with respect to the image capturing surface to change while viewing the image 162 of the target object within the instruction screen 160, whereby the image capturing apparatus 12 can capture the target object from various angles as illustrated in FIG. 10.

Note that the captured image obtainment unit 50 may similarly cause display of an instruction screen for changing the position, orientation, or angle of the image capturing apparatus 12 or illumination. For example, in an aspect where the image capturing apparatus 12 is mounted to a head-mounted display that a user wears, the user themself moves, whereby the angle of the target object can be caused to change with respect to an image capturing surface. In a case of causing the light source to change, a user may be caused to move illumination or may be instructed to turn the illumination on or off. In a case where the image capturing apparatus 12 has a function for flash image capturing, image capturing may be performed in a state where a flash is turned on or off by a user or due to control by the image processing apparatus 10.

Furthermore, the captured image obtainment unit 50 may obtain an image resulting from capturing the same target object at different periods of time within one day. In an environment such as image capturing outside or where sunlight from a window during the day is the main light source, the light intensity or type of light source changes between periods of time such as morning, noon, and night. It is possible to use this and obtain images having different reflection characteristics by capturing at different periods of time. It may be that an above-described state change may be performed for only one of the image capturing apparatus 12, the target object, or the light source or may be performed in combination of the image capturing apparatus 12, the target object, and the light source.

FIG. 12 exemplifies a polarization degree table generated by the polarization degree obtainment unit 54. A polarization degree table 170 includes data in which identification information for an obtained polarized image set is associated with respective degrees of polarization. As described above, the degree of polarization here may be a value resulting from averaging degrees of polarization obtained for each pixel in a region of an image of a target object, or may be, inter alia, a histogram or a two-dimensional distribution of degrees of polarization for the region of the image. In a case where a region having a high degree of polarization and a region having a low degree of polarization are included in the region of the image of the target object, position information for each region may be associated with, inter alia, an average value for the respective degree of polarization.

The image selection unit 62 in the material information estimation unit 56 refers to the polarization degree table 170 to thereby determine an input image or a region to be used to estimate material information. For example, the image selection unit 62 selects, as an image having a high degree of polarization, one image for which the average value for the degree of polarization is maximum. In this case, in the example illustrated, the #3 image is selected. Alternatively, the image selection unit 62 may select any number of images having a degree of polarization higher than a threshold t_h, which is set in order to select images having high degrees of polarization. Images having high degrees of polarization are preferentially selected, whereby an image that includes both a diffuse reflection component and a specular reflection portion is more likely to be inputted, and it is easier to improve the accuracy of estimating metalness or surface roughness in particular.

Meanwhile, an image having a low degree of polarization is also selected, whereby it is possible to further improve the accuracy of estimating object color according to diffuse reflection. In this case, for example, the image selection unit 62 also selects an image for which an average value for degree of polarization is minimum. In the example illustrated, the #1 image is selected. Alternatively, the image selection unit 62 may select any number of images having a degree of polarization lower than a threshold t_1 (however, t_1<t_h), which is set in order to select images having low degrees of polarization.

In addition, the image selection unit 62 may select an image having a degree of polarization that is increased by a predetermined value D or more or an image having a degree of polarization that is reduced by a predetermined value D' or more with respect to a degree of polarization held by an image that is a reference or a reference degree of polarization, such as an average value or a median of all degrees of polarization represented in the polarization degree table 170. The differences D and D' with respect to the reference value may be the same or may be different. Alternatively, the image selection unit 62 may select two images having a difference in degree of polarization of a predetermined value D" or more.

Note that, in such a manner, "image having a high degree of polarization" stated in the description thus far may have various selection criteria, such as an image having the maximum degree of polarization from among obtained images, an image having a degree of polarization that is higher than the threshold t_h, an image having a degree of polarization that is higher than a reference degree of polarization by the predetermined value D or more, or that having the higher degree of polarization from among an image pair having a difference of the predetermined value D" or more in degrees of polarization. Similarly, "image having a low degree of polarization" stated in the description thus far may have various selection criteria, such as an image having the minimum degree of polarization from among obtained captured images, an image having a degree of polarization that is lower than the threshold t_1, an image having a degree of polarization that is lower than a reference degree of polarization by the predetermined value D' or more, or that having the lower degree of polarization from among an image pair having a difference of the predetermined value D" or more in degrees of polarization. In description below, "high polarization degree image" and "low polarization degree image" are used with the same meanings as these.

FIG. 13 exemplifies setting information that is in order for the material information estimation unit 56 to switch details of processing, depending on the degree of polarization. A processing details switching setting table 180 in the example in the figure is data resulting from associating a type of image to input and an algorithm to be used to estimate material information with a combination of high/low degree of polarization for an obtained captured image and an approximate material of a target object. Regarding high/low for the degree of polarization, various conditions can be considered as described above, and the settings may diverge further according to a condition satisfied by a real captured image.

In the example in the figure, in a case where the approximate material is "unclear" for an image for which the degree of polarization is "high," an input image is set to "specular reflection image," and using "deep learning (model A)" as an estimation algorithm is set. In contrast, even with the same "high" degree of polarization, in a case where the material being "plastic" is registered, using "deep learning (model B)" as the estimation algorithm is set. In a case where the material is "vinyl," data to use for material information is set to "natural light color image," and using "arithmetic program a" as the estimation algorithm is set. Here, "arithmetic program" is a program that stipulates a formula for estimating respective items of material information.

Settings are similar for an image having a "low" degree of polarization. However, a diffuse reflection component is dominantly estimated for a low polarization degree image, and thus a "natural light color image" is used as an input image, whereby it is possible to estimate an object color at high accuracy. In a case where the material is "unclear" in the example in the figure, "deep learning (model A)" is set to be used for the estimation algorithm, regardless of high/ low for the degree of polarization. In such a manner, the same algorithm may be used in some cases, even if different reflection characteristics are obtained. In contrast, the degree of polarization or additional information are used to set an optimal type of input image or algorithm to thereby increase the possibility of being able to estimate material information at high accuracy in a wide range of environments, even without developing an enormous deep learning database.

Figure 14:
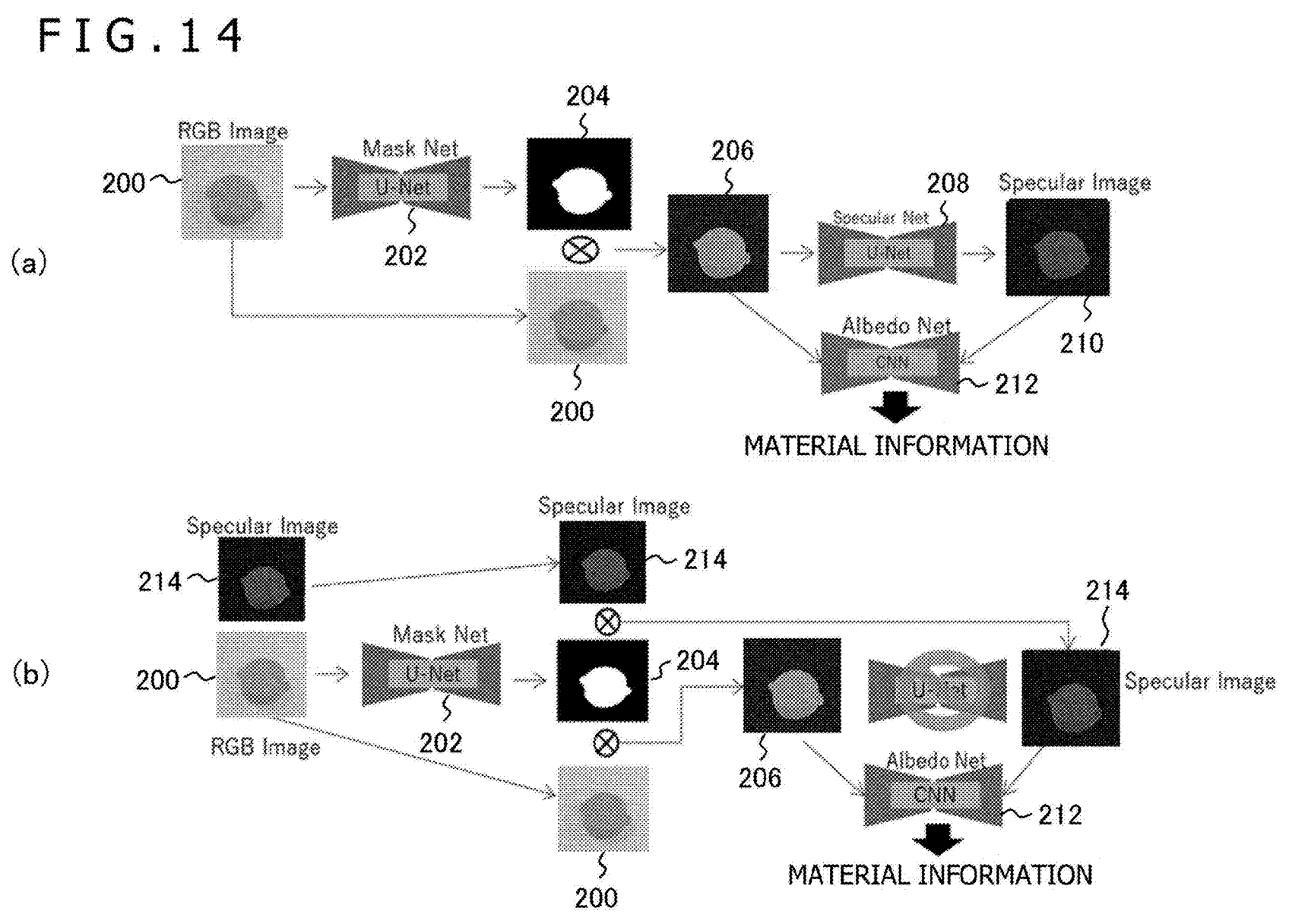

FIG. 14 exemplifies deep learning networks used when the estimation unit 66 in the material information estimation unit 56 estimates material information. (a) in the upper row is a network that estimates material information by employing a natural light color image as an input image, and applies the technique disclosed in NPL 1. Specifically, a mask net 202 is first used to generate a mask image 204 for masking a region other than an image of a target object in a color image (RGB Image) 200. The mask image 204 is applied to the original color image 200 to thereby generate an image 206 resulting from enabling only the image of the target object.

Next, a specular net 208 is used to obtain a specular reflection image (Specular Image) 210 of the target object from the image 206. Employing the image 206 resulting from enabling only the image of the target object from among the original color image and the specular reflection image 210 of the target object as input data, an albedo net 212 is used to output predetermined material information such as object color, metalness, or surface roughness.

(b) is a network for obtaining material information by employing a natural light color image as well as a specular reflection image as input data. That the mask net 202 is used to generate a mask image 204 from a color image (RGB Image) 200 and this is used to generate an image 206 resulting from enabling only an image of a target object from among the original color image 200 is similar to (a). In contrast, in this case, computation is used to generate a specular reflection image 214 from a polarized image set, whereby a specular net 208 for estimating this is not used. Similarly to (a), the image 206 resulting from enabling only the image of the target object from among the original color image and the specular reflection image 214 of the target object are employed as input data, and an albedo net 212 is used to output predetermined material information such as an object color, metallicity, or surface roughness.

The material information estimation unit 56 according to the present embodiment, on the basis of additional information or a degree of polarization of a captured image that is actually obtained, switches to and uses a network that is more likely to produce better accuracy, from among the (a) and (b) networks, for example. Accordingly, for example, experiments are performed regarding target objects having various surface characteristics, a trend for likeliness to produce accuracy is obtained, and then an appropriate network is set in the processing details switching setting table 180 as illustrated in FIG. 13. Note that the illustrated deep learning networks are examples, and there is no aim to limit the present embodiment thereto.

Figure 15:
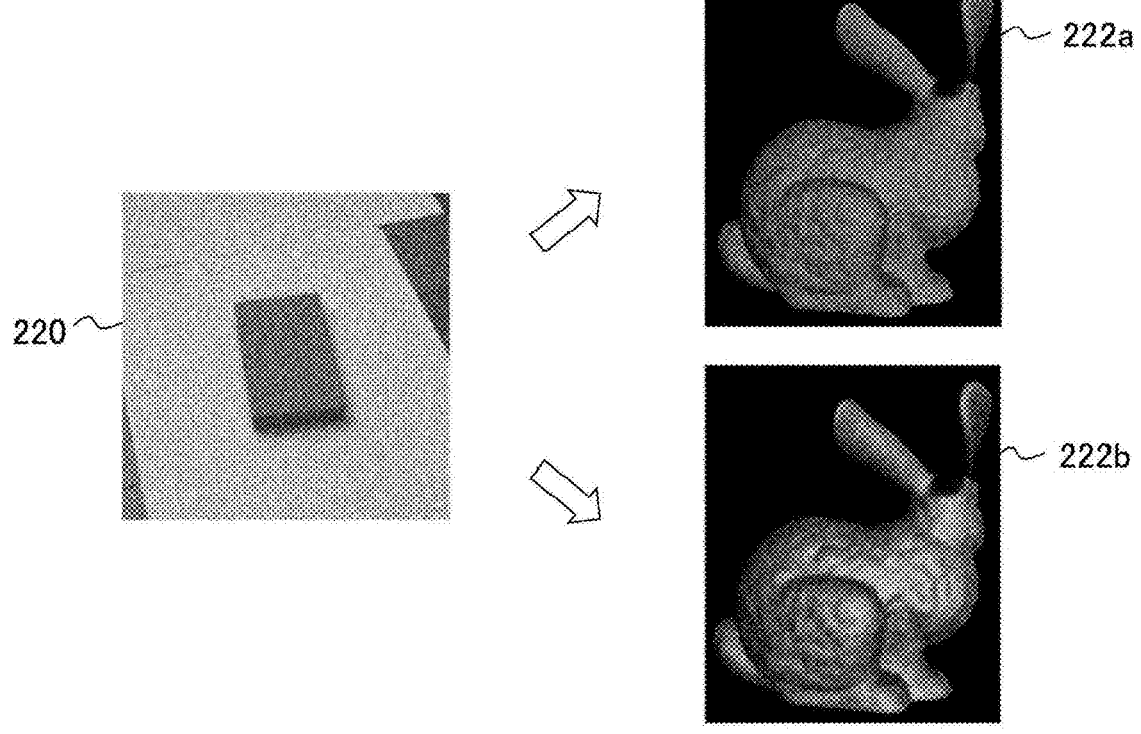
FIG. 15 is a view that compares results of estimating material information using (a) and (b) networks in FIG. 14.

FIG. 15 compares results of estimating material information using the (a) and (b) networks in FIG. 14. In this example, a sponge having no luster is set as a target object and, from a captured image 220 thereof, material information is estimated by the (a) and (b) networks. An image 222*a* and an image 222*b* are results of drawing rabbit objects using results of estimation by the (a) and (b) networks, respectively. There is a particular visual difference between the two. On the basis of the fact that the target object is a sponge, it is understood that the accuracy of the (a) network, from which the result of the image 222*a* is obtained, has high accuracy.

Figure 16:
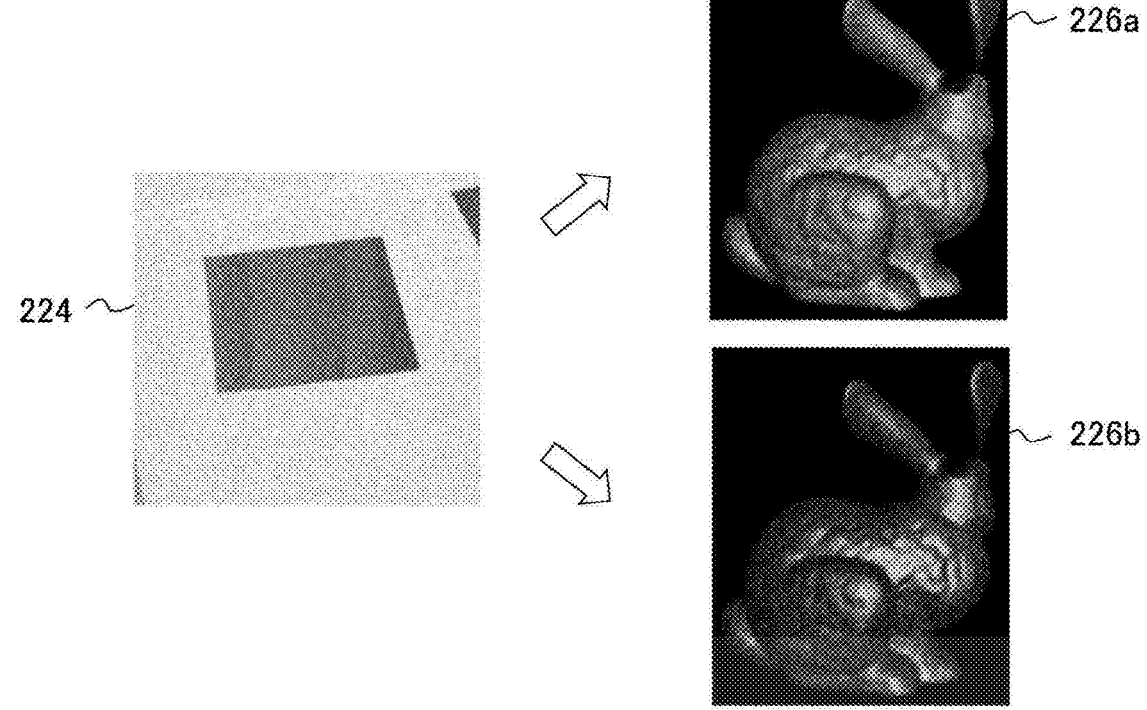
FIG. 16 is a view that compares results of estimating material information using (a) and (b) networks in FIG. 14.

FIG. 16 compares different results of estimating material information using the (a) and (b) networks in FIG. 14. In this example, a plastic plate having luster is set as a target object and, from a captured image 224 thereof, material information is estimated by the (a) and (b) networks. An image 226*a* and an image 226*b* are results of drawing rabbit objects using results of estimation by the (a) and (b) networks, respectively. On the basis of the fact that the target object is a plastic plate that has luster, it is understood that the (b) network, from which the result of the image 226*b* is obtained, has high accuracy.

According to the experimental results illustrated in FIGS. 15 and 16, if there is a target object for which the material thereof is matte and less likely to produce specular reflection, it is understood that the (a) network, which estimates even a specular reflection image by deep learning, is advantageous. In contrast, if there is a target object for which the material thereof has luster and is more likely to produce specular reflection, it is understood that the (b) network, which generates a specular reflection image in advance from a polarized image, is advantageous. The processing details switching setting table 180 is created on the basis of such experiments and networks such as (a) and (b) are separately used on the basis of actual degrees of polarization, whereby it is possible to stably estimate material information at high accuracy.

Figure 17:
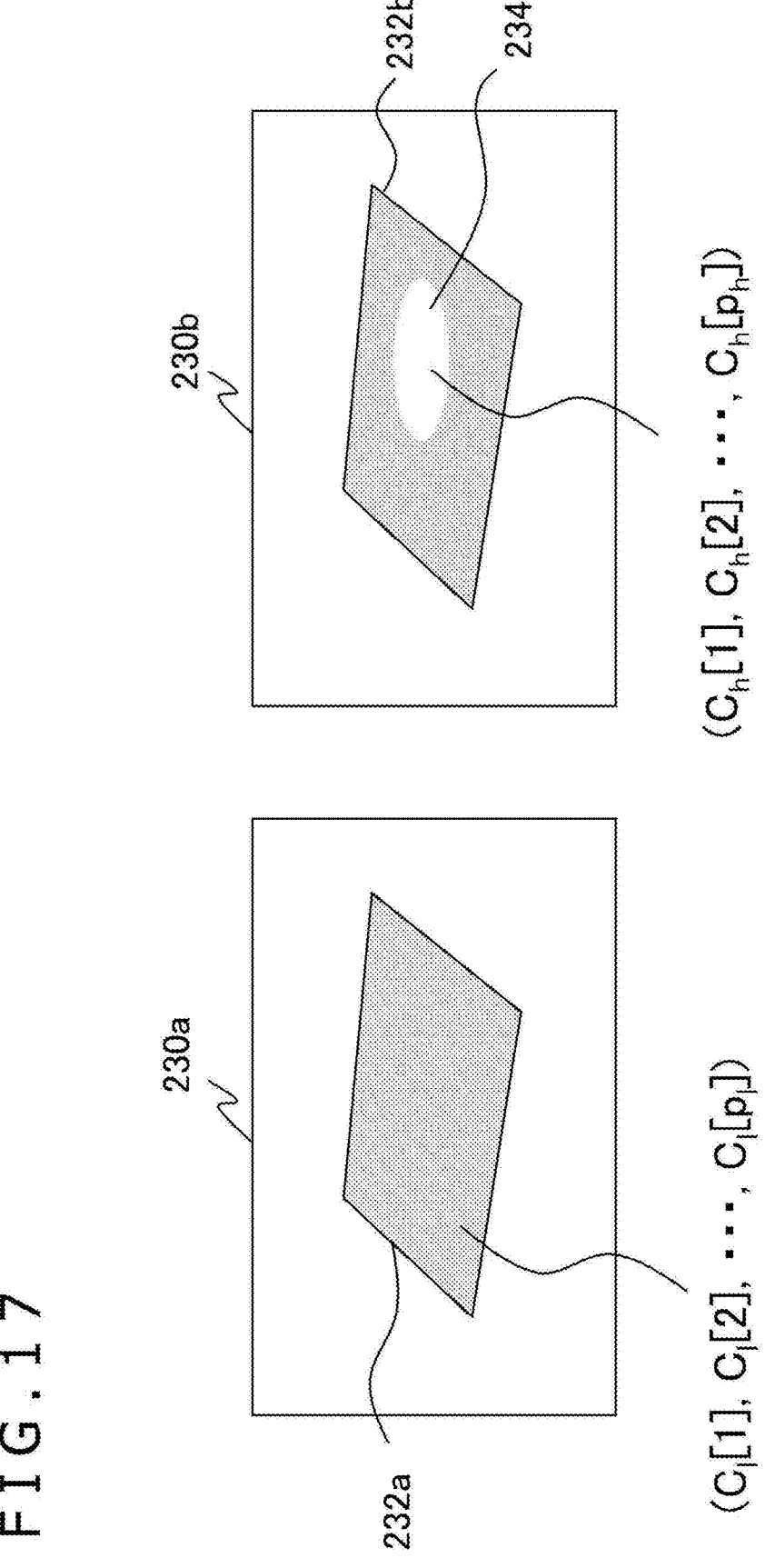
FIG. 17 is a view for describing an example of a technique in which the estimation unit in the material information estimation unit, according to the present embodiment, estimates material information using computation.

FIG. 17 is a view for describing an example of a technique in which the estimation unit 66 in the material information estimation unit 56 estimates material information using computation. It is assumed that a low polarization degree image 230*a* and a high polarization degree image 230*b* are used in this example. In the low polarization degree image 230*a*, let the number of pixels that are included in a region for an image 232*a* of a target object be $p_1$, and let pixel values thereof be $(C_1[1], C_1[2], \ldots, C_1[p_1])$. In addition, in the high polarization degree image 230*b*, let the number of pixels included in a region 234 that is from among an image 232*b* of the target object and in which a degree of polarization is higher than a threshold be $p_h$, and let pixel values thereof be $(C_h[1], C_h[2], \ldots, C_h[p_h])$. At this point, in order to calculate an object color C and a metalness M, the following formulae are prepared, for example.

[Math. 5]

$$C = \frac{\sum C_l[p1]}{p_l}, (1 \le p1 \le p_l) \quad \text{(Formulae 5)}$$

-continued $$M = \left( \frac{\sum C_h[p2]}{p_h} - \frac{\sum C_l[p1]}{p_l} \right) / \frac{\sum C_h[p2]}{p_h}, (1 \le p1 \le p_l, 1 \le p2 \le p_h)$$

Note that the pixel value $C_1[p1]$ used to calculate the object color C is a color value that has (R, G, B) elements and, for example, is an average value for each element of values of corresponding pixels in a polarized image set for four directions. Each of the pixel values $C_1[p1]$ and $C_h[p2]$ used to calculate the metalness M may be a color value or may be a luminance value Y that can be derived from a typical conversion formula from each value from among RGB. In other words, the formulae 5 employ an average of color values of pixels having low degrees of polarization as a color value of the target object itself, and a value resulting from normalizing a difference in color values (or luminance values) between pixels having high degrees of polarization and pixels having low degrees of polarization is employed as the metalness.

Note that, from among the image 232*b* of the target object in the high polarization degree image 230*b*, it is possible for pixels having low degrees of polarization to be present in a region other than the region 234 in which the degree of polarization is higher than a threshold. Therefore, it may be that the above-described calculation is performed from only the high polarization degree image 230*b*. In contrast, a surface roughness R means a degree for a spread of specular reflection. Therefore, the area of the region 234 having the degree of polarization greater than the threshold in the high polarization degree image 230*b* and consequently the number of pixels $p_h$ included therein can be used as indexes. For example, a table or formula that associates the number of pixels $p_h$ with the surface roughness R is created in advance, whereby the surface roughness R is directly obtained from an actual number of pixels $p_h$.

In place of the number of pixels $p_h$, it may be that the ratio of the number of pixels $p_h$ in the region 234 having the high degree of polarization with respect to the total number of pixels included in the image 232*b* of the target object or an area ratio is used such that the surface roughness R can be obtained. Note that the abovementioned formulae for deriving material information are examples, and there is no aim to limit the present embodiment thereto.

FIG. 18 exemplifies, in a case where multiple sets of material information are estimated, setting information for the estimation unit 66 to combine these sets and thereby obtain final material information. In a case where multiple sets of material information are estimated, at least any one of a case where multiple algorithms are used in the estimation and a case where multiple images are used in estimation can occur. An algorithm score table 240 in this example, is data that uses scores to represent at what level of accuracy each algorithm can perform estimation with respect to a combination of additional information and high/low degrees of polarization for an input image. In the figure, k1, k2, k3, . . . are numerical values that represent actual scores.

In the figure, as an example, scores are set with respect to a combination of whether an input image has a "high degree of polarization" or a "low degree of polarization," and an approximate material (including the case of unclear) that is for the target object and is obtained as additional information. Units for setting scores are not limited to this and, inter alia, the type of input image or the type or state of a light source may be introduced. The estimation unit 66 extracts, on the basis of a corresponding condition such as a degree of polarization, a score for each algorithm used in estimation, and performs normalization thereof such that a sum of these becomes 1, whereby weighting coefficients for multiple estimation results are determined. For example, it is assumed that there are a result of estimating material information using "deep learning (model A)" from a high polarization degree image of a target object that is "plastic" and a result of estimating material information using "deep learning (model B)" from a low degree of polarization image of the same target object.

Respective scores are k4 and k14, as illustrated by ellipses. Accordingly, the estimation unit 66 sets a weighting coefficient for the former result to k4/(k4+k14) and sets a weighting coefficient for the latter result to k14 (k4+k14). The estimation unit 66 calculates a weighted average using the weighting coefficients determined in this manner to thereby derive final material information. Note that weighting coefficients may be shared regardless of the type of material information or may differ by type such as an object color, metalness, or surface roughness. In the latter case, an algorithm score table 240 such as that illustrated is prepared for each type of material information.

Figure 19:
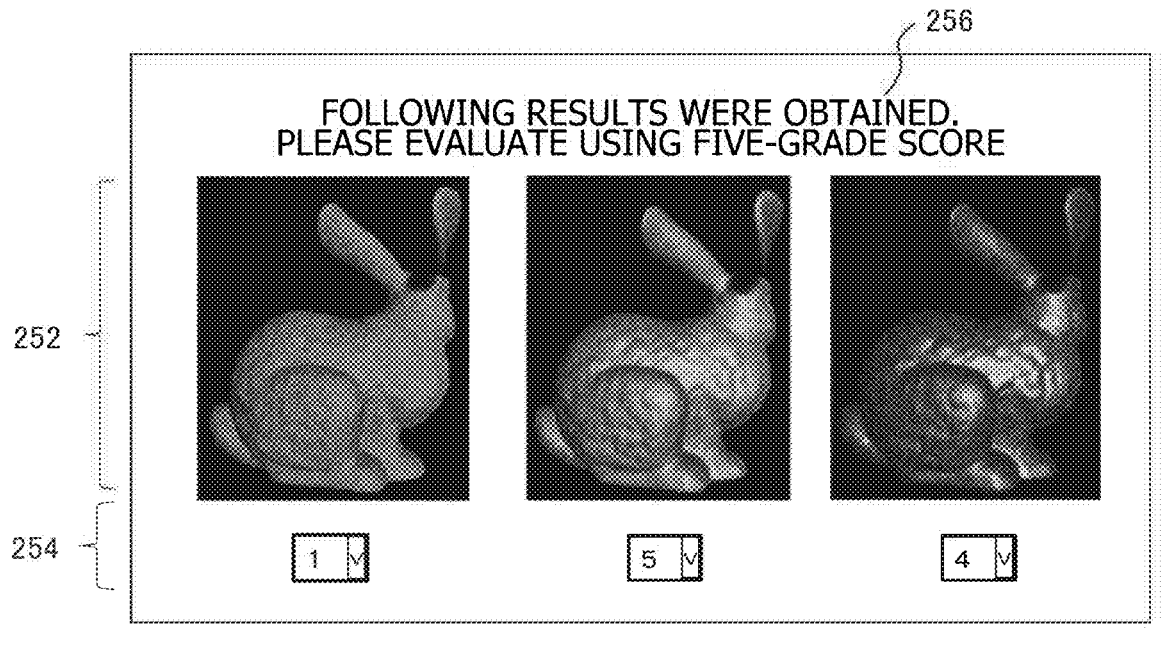
FIG. 19 is a view that exemplifies, in a case where multiple sets of material information are estimated in the present embodiment, a screen that is for evaluation by a user and is caused to be displayed by the estimation unit in order to combine these sets and thereby obtain final material information.

FIG. 19 exemplifies, in a case where multiple sets of material information are estimated, a screen that is for evaluation by a user and is caused to be displayed by the estimation unit 66 in order to combine these sets and thereby obtain final material information. In this example, an evaluation screen 250 includes a result image display section 252 and a score input box section 254. The result image display section 252 illustrates results of the estimation unit 66 using respective material information from estimation results to draw a predetermined object. In this example, three result images using three sets of material information are illustrated.

The score input box section 254 is a section for a user to input, using a score, a result of evaluating the visual accuracy of each result image. In the example in the figure, setting has been made such that evaluation is by a five-grade score as indicated by an instruction text 256 represented at the upper section of the screen. Accordingly, the score input box section 254 displays score input boxes, which enable the selection of a numerical value from 1 to 5 using a pull-down operation or the like, according to association with respective result images. A user essentially indicates a score by evaluating to what degree a result image matches the actual appearance of the target object. However, evaluation criteria are not limited to this, and desirability as material information may be subjectively evaluated by a user.

The estimation unit 66 normalizes the scores inputted by the user such that the sum thereof becomes 1 to thereby determine weighting coefficients for the estimation results and uses these to perform a weighted average to thereby derive final material information. Note that the illustrated evaluation screen 250 is an example, and there is no limitation to the displayed result images or evaluation means. For example, the score input box section 254 may be provided for each type of material information, such as object color, metalness, or surface roughness. In addition, as the result image display section 252, it may be that, in a coordinate space having values of multiple types of material information as axes are illustrated in FIG. 3, result images are disposed at corresponding positions and a user is able to select position coordinates, in other words, values of material information that are considered to be appropriate.

Figure 20:
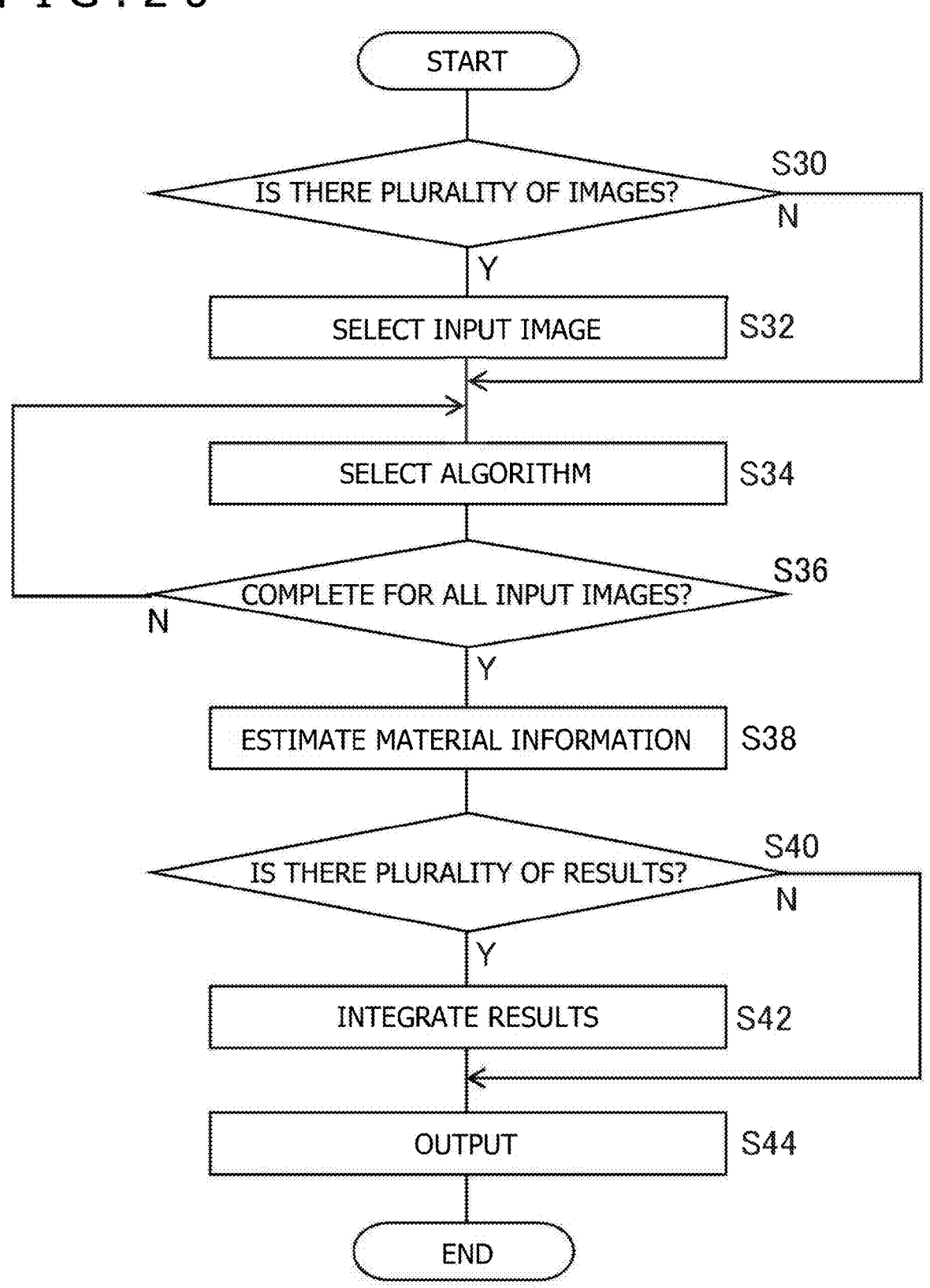
FIG. 20 is a flow chart that illustrates a processing procedure in which the material information estimation unit in the image processing apparatus according to the present embodiment estimates and outputs material information.

Next, description is given regarding operation by the image processing apparatus 10 that can be realized by the configurations described thus far. FIG. 20 illustrates a processing procedure in which the material information estimation unit 56 in the image processing apparatus 10 according to the present embodiment estimates and outputs material information. Note that this processing primarily corresponds to the processing in S16 in FIG. 4. However, in a case of perform a mask process using deep learning as illustrated in FIG. 14, the processing of S14 in FIG. 4 may be included. First, in a case where the captured image obtainment unit 50 has obtained polarized image sets under multiple image capturing states and the polarization degree obtainment unit 54 has obtained each degree of polarization (Y in S30), the image selection unit 62 selects an input image according to a predetermined criterion (S32).

In the simplest terms, in parallel with the polarization degree obtainment unit 54 sequentially obtaining the degree of polarization for the polarized image sets, the image selection unit 62 compares the degree of polarization with a threshold and, at a time when an image having a degree of polarization higher than the threshold t_h for detecting a high polarization degree image is obtained, employs only this image as input data. Alternatively, in addition to this, the image selection unit 62, at a time when an image having a degree of polarization less than the threshold t_1 for detecting a low polarization degree image is obtained, also employs this image as input data.

In contrast, in a case where the polarization degree obtainment unit 54 creates a table that associates images in all image capturing states with the degrees of polarization thereof, the image selection unit 62 may select an input image after the table is created. At this point, as a high polarization degree image, the image selection unit 62 selects an image having the highest degree of polarization or an image having a degree of polarization greater than the threshold t_h for detecting a high polarization degree image. In addition to this, as a low polarization degree image, the image selection unit 62 may select an image having the lowest degree of polarization or an image having a degree of polarization less than the threshold t_1 for detecting a low polarization degree image. Alternatively, it may be that the image selection unit 62 selects an image having an image having a degree of polarization higher than a reference value by the predetermined value D or more and an image having a degree of polarization lower than the reference value by the predetermined value D' or more or selects two images for which a difference in degrees of polarization is greater than or equal to the predetermined value D".

Note that, as described above, a criterion for image selection may be adaptively switched according to additional information or the degree of polarization itself. In a case where the image selection unit 62 has selected an image (S32) or in a case where only one polarized image set is originally obtained (N in S30), the algorithm switching unit 64, on the basis of the degree of polarization of the inputted image, selects an algorithm to be used to estimate material information (S34). In other words, an algorithm estimated to achieve the highest accuracy is selected on the basis of, inter alia, an amount of specular reflection components which is estimated from the degree of polarization.

At this stage, the image selection unit 62 may collaborate with the algorithm switching unit 64 to select the type of input image on the basis of, inter alia, the amount of specular reflection components estimated from the degree of polarization. As described above, options here include a diffuse reflection image or a specular reflection image which can be generated from a polarized image, or a natural light color image. Note that, in addition to the magnitude of a degree of polarization, additional information such as an approximate material of a target object may be used for a criterion for selecting an algorithm or as a type of input image, as indicated in FIG. 13.

In a case of using multiple images to estimate material information, an appropriate algorithm is selected for each image (N in S36, S34). Once an estimation algorithm is determined for all input images (Y in S36), the estimation unit 66 uses the selected algorithms to estimate material information (S38). In a case where multiple sets of material information are obtained according to multiple algorithms or multiple input images (Y in S40), the estimation unit 66 combines them using, inter alia, a weighted average that corresponds to a likelihood of the algorithms and derives a final result (S42).

At this time, the estimation unit 66, on the basis of additional information such as the approximate material of a target object or the degree of polarization of an input image, appropriately adjusts a weight to impart to each result. Alternatively, the estimation unit 66 may indicate a result of drawing a predetermined object on the basis of each result to a user and adjust the weights on the basis of results of evaluation by the user. The estimation unit 66 outputs final material information, which has been combined in this manner, to the material information storage unit 58 (S44). Alternatively, the estimation unit 66 employs only one set of material information obtained in S38 as a final result, and outputs the final result to the material information storage unit 58 (N in S40, S44). The estimation unit 66 may cause, via the output data generation unit 60, the display apparatus 16 to display the final result itself or an image representing an object drawn using this.

By virtue of the present embodiment described above, a polarized image is used in a technique for estimating material information of a target object using image capturing. Specifically, details of processing for estimating material information are caused to adaptively change on the basis of a reflection characteristic of an image of the target object belonging to the polarized image. For example, an image having strong specular reflection is identified on the basis of the degree of polarization and used to estimate the material information. As a result, it is possible to accurately estimate material information that represents luster of a surface, such as metalness or surface roughness. In addition, because it is possible to separate specular reflection and diffuse reflection, the possibility of confusing a color of an image due to specular reflection with the color of the target object itself decreases.

In addition, an algorithm or type of image used to estimate material information is switched, as appropriate, on the basis of the degree of polarization. As a result, it is possible to optimize estimation processing means according to various target objects or the state of images thereof, and it is possible to estimate material information at stable accuracy in any environment. In estimation that uses deep learning in particular, it is possible to adaptively use networks or databases having different characteristics, whereby even if each of these has a simple configuration, it is possible to estimate material information at high accuracy in a wide range of environments.

Description was given above on the basis of an embodiment of the present invention. The above-described embodiment is an example, and a person skilled in the art would understand that various variations can be made to combinations of respective components or processing processes of the embodiment, and that these variations are within the scope of the present invention.

REFERENCE SIGNS LIST

10: Image processing apparatus
12: Image capturing apparatus
16: Display apparatus
23: CPU
24: GPU
26: Main memory
50: Captured image obtainment unit
52: Image data storage unit
54: Polarization degree obtainment unit
56: Material information estimation unit
58: Material information storage unit
60: Output data generation unit
62: Image selection unit
64: Algorithm switching unit
66: Estimation unit

INDUSTRIAL APPLICABILITY

In the above manner, the present invention can be used in various information processing apparatuses such as a game apparatus, a content generation apparatus, a portable terminal, a monitoring system, an in-vehicle camera system, an inspection apparatus, and an autonomous robot.

The invention claimed is:

1. An image processing apparatus comprising:
a captured image obtainment unit configured to obtain multiple captured images resulting from using a polarizing camera to capture a target object while causing, for at least any one of the target object and a light source, an angle with respect to an image capturing surface or a state of the light source to differ;
a polarization degree obtainment unit configured to obtain a degree of polarization of an image of the target object in each of the captured images; and
a material information estimation unit configured to (1) use a captured image selected on a basis of the degree of polarization or an image obtained from the captured image to estimate material information regarding the target object and (2) calculate final material information by performing a weighted average using weights determined based the degrees of polarization of a plurality of captured images used in estimating the material information regarding the target object.

2. The image processing apparatus according to claim 1, wherein the material information estimation unit estimates the material information after, on the basis of the degree of polarization, selecting an algorithm used in the estimation.

3. The image processing apparatus according to claim 2, wherein the material information estimation unit selects the algorithm from any one of a formula and multiple deep learning models having different networks or databases.

4. The image processing apparatus according to claim 2, wherein the material information estimation unit, according to additional information pertaining to the target object or the light source, causes at least any one of the algorithm used in the estimation or a selection policy for an image used to estimate the material information to change.

5. The image processing apparatus according to claim 1, wherein the material information estimation unit, on the basis of the degree of polarization, switches a type of the image used in the estimation.

6. The image processing apparatus according to claim 5, wherein, when a captured image satisfying a predetermined condition indicating that the degree of polarization is high is obtained, the material information estimation unit uses, in the estimation, a specular reflection image formed by separating a specular reflection component from the captured image.

7. The image processing apparatus according to claim 1, wherein, upon using multiple algorithms to respectively estimate material information, the material information estimation unit calculates the final material information by performing the weighted average by weights determined on a basis of a combination of the degrees of polarization of the images used in the estimation and the algorithms used in the estimation.

8. The image processing apparatus according to claim 1, wherein the material information estimation unit calculates the final material information by, upon estimating multiple items of material information, drawing an object that reflects each item of material information, subsequently causing a display apparatus to display the object, and performing the weighted average by weights decided by accepting an evaluation from a user.

9. The image processing apparatus according to claim 1, wherein the material information estimation unit uses a captured image satisfying a predetermined condition indicating that the degree of polarization is high or an image obtained from the captured image to estimate the material information.

10. The image processing apparatus according to claim 1, wherein the material information estimation unit uses multiple captured images satisfying a predetermined condition indicating that there is a difference in the degrees of polarization or an image obtained from the multiple captured images to estimate the material information.

11. The image processing apparatus according to claim 1, wherein the material information estimation unit, on the basis of the degree of polarization, causes the number of images to be used to estimate the material information to change.

12. The image processing apparatus according to claim 1, wherein the captured image obtainment unit obtains the captured image by extracting a frame from data for a moving image that is captured while causing the angle to change.

13. The image processing apparatus according to claim 1, wherein the captured image obtainment unit obtains the multiple captured images from the polarizing camera mounted by a head-mounted display.

14. A material information obtainment method comprising:

obtaining multiple captured images resulting from using a polarizing camera to capture a target object while causing, for at least any one of the target object and a light source, an angle with respect to an image capturing surface or a state of the light source to differ;

obtaining a degree of polarization of an image of the target object in each of the captured images;

using a captured image selected on a basis of the degree of polarization or an image obtained from the captured image to estimate material information regarding the target object; and calculating final material information by performing a weighted average using weights determined based the degrees of polarization of a plurality of captured images used in estimating the material information regarding the target object.

15. A non-transitory computer readable medium storing one or more computer programs causing a computer to realize:

by a captured image obtainment unit, obtaining multiple captured images resulting from using a polarizing camera to capture a target object while causing, for at least any one of the target object and a light source, an angle with respect to an image capturing surface or a state of the light source to differ;

by a polarization degree obtainment unit, obtaining a degree of polarization of an image of the target object in each of the captured images; and by a material information estimation unit, (1) using a captured image selected on a basis of the degree of polarization or an image obtained from the captured image to estimate material information regarding the target object and (2) calculating final material information by performing a weighted average using weights determined based the degrees of polarization of a plurality of captured images used in estimating the material information regarding the target object.

\* \* \* \* \*